United States Patent
Yu et al.

(10) Patent No.: US 12,277,403 B2
(45) Date of Patent: Apr. 15, 2025

(54) DATA PROCESSING METHOD AND APPARATUS, COMPUTER DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Xiaoyu Yu, Shenzhen (CN); Dewei Chen, Shenzhen (CN); Feng Han, Shenzhen (CN); Jiaxin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/335,491

(22) Filed: Jun. 15, 2023

(65) Prior Publication Data
US 2023/0325149 A1 Oct. 12, 2023

Related U.S. Application Data

(63) Continuation of application No. PCT/CN2022/118483, filed on Sep. 13, 2022.

(30) Foreign Application Priority Data

Oct. 25, 2021 (CN) .......................... 202111242449.5

(51) Int. Cl.
*G06F 16/00* (2019.01)
*G06F 7/08* (2006.01)
*G06F 16/901* (2019.01)

(52) U.S. Cl.
CPC .............. *G06F 7/08* (2013.01); *G06F 16/901* (2019.01)

(58) Field of Classification Search
CPC .................................................. G06F 16/2379
(Continued)

(56) References Cited

U.S. PATENT DOCUMENTS

| 2010/0031003 A1 | 2/2010 | Chen et al. |
| 2011/0295862 A1 | 12/2011 | Taylor |

(Continued)

FOREIGN PATENT DOCUMENTS

| CN | 111913955 A | 11/2020 |
| CN | 112015366 A | 12/2020 |
| CN | 114356512 A | 4/2022 |

OTHER PUBLICATIONS

The World Intellectual Property Organization (WIPO) International Search Report for PCT/CN2022/118483 Nov. 25, 2022 7 Pages (including translation).

(Continued)

*Primary Examiner* — Chelcie L Daye
(74) *Attorney, Agent, or Firm* — ANOVA LAW GROUP, PLLC

(57) ABSTRACT

A data processing method includes: acquiring a data sorting request for a data sequence to be sorted, and invoking C data bitonic sorting components in response to the data sorting request, C being a positive integer greater than 1; initiating B data bitonic sorting tasks according to the data sequence and the C data bitonic sorting components, B being a positive integer greater than 1, the B data bitonic sorting tasks being respectively associated with different data subsequences of B data subsequences, and the B data subsequences being generated based on the to-be-sorted data sequence; operating the C data bitonic sorting components in parallel according to the B data bitonic sorting tasks to obtain B data sorting subresults; and combining the B data (Continued)

sorting subresults based on the C data bitonic sorting components to obtain a data sorting result for the data sequence.

20 Claims, 11 Drawing Sheets

(58) Field of Classification Search
USPC .......................................................... 707/741
See application file for complete search history.

(56) References Cited

U.S. PATENT DOCUMENTS

| | | | |
|---|---|---|---|
| 2016/0357580 A1 | 12/2016 | Lyashevsky | |
| 2020/0019374 A1* | 1/2020 | Prathapan | G06F 5/065 |
| 2020/0074690 A1 | 3/2020 | Fukagai et al. | |
| 2021/0124500 A1* | 4/2021 | Salamat | G06F 3/0638 |
| 2023/0325149 A1 | 10/2023 | Yu et al. | |

OTHER PUBLICATIONS

J Chhugani et al., Efficient implementation of sorting on multi-core SIMD CPU architecture[J]. Proceedings of the VLDB Endowment, 2008, 1(2): 1313-1324.

T Nakatani et al., K-way bitonic sort[J]. IEEE Transactions on Computers, 1989, 38(2): 283-288.

M F Ionescu et al., Optimizing parallel bitonic sort[C]//Proceedings 11th International Parallel Processing Symposium. IEEE, 1997: 303-309.

X Ye et al., High performance comparison-based sorting algorithm on many-core GPUs[C]//2010 IEEE International Symposium on Parallel & Distributed Processing (IPDPS). IEEE, 2010: 1-10.

D i arkhipov et al., Sorting with gpus: A survey[J]. arXiv preprint arXiv:1709.02520, 2017.

The European Patent Office (EPO) The Extended European Search Report for Application No. 22885453.5 Sep. 3, 2024 7 Pages.

* cited by examiner

DATA PROCESSING METHOD AND APPARATUS, COMPUTER DEVICE, AND COMPUTER-READABLE STORAGE MEDIUM

CROSS-REFERENCES TO RELATED APPLICATIONS

This application is a continuation application of PCT Patent Application No. PCT/CN2022/118483, entitled "DATA PROCESSING METHOD AND APPARATUS, COMPUTER DEVICE, COMPUTER-READABLE STORAGE MEDIUM, AND COMPUTER PROGRAM PRODUCT" and filed on Sep. 13, 2022, which claims priority to Chinese Patent Application No. 202111242449.5, filed with the Chinese Patent Office on Oct. 25, 2021, the entire contents of both of which are incorporated herein by reference.

FIELD OF THE TECHNOLOGY

The present disclosure relates to the field of Internet technologies, and in particular, to a data processing method and apparatus, a computer device, a computer-readable storage medium, and computer program product.

BACKGROUND OF THE DISCLOSURE

Sorting is widely applied to scenarios such as a database, target recognition, and text analysis, and is a common operation in artificial intelligence models and target detection models. Representative sorting algorithms include bitonic sort, odd-even sort, radix sort, and the like. Due to the unique parallelism and data-index independence, bitonic sort has important application value in parallel computing and other fields.

Bitonic sort has definite execution time, so it is very suitable for hardware implementation. However, during execution of a sorting task, it is necessary to perform multiple rounds of traversal on to-be-sorted data, which increases the execution time and reduces the sorting efficiency.

SUMMARY

Embodiments of the present disclosure provide a data processing method and apparatus, a computer device, a computer-readable storage medium, and a computer program product, which can not only reduce the execution time of a sorting task, but also improve the sorting efficiency.

The embodiments of the present disclosure provide a data processing method, which is performed by a computer device and includes: acquiring a data sorting request for a data sequence to be sorted, and invoking C data bitonic sorting components according to the data sorting request, C being a positive integer greater than 1; initiating B data bitonic sorting tasks according to the data sequence and the C data bitonic sorting components, B being a positive integer greater than 1, and the B data bitonic sorting tasks being respectively associated with different data subsequences of B data subsequences, and the B data subsequences being generated based on the data sequence; operating the C data bitonic sorting components in parallel according to the B data bitonic sorting tasks to obtain B data sorting subresults outputted by the C data bitonic sorting components, one data sorting subresult indicating a sorting result of one of the data subsequences associated with one of the data bitonic sorting tasks; and combining the B data sorting subresults based on the C data bitonic sorting components to obtain a data sorting result for the data sequence.

The embodiments of the present disclosure provide a data processing apparatus, which includes: a component invocation module, configured to acquire a data sorting request for a data sequence, and invoke C data bitonic sorting components according to the data sorting request, C being a positive integer greater than 1; a task initiation module, configured to initiate B data bitonic sorting tasks according to the to-be-sorted data sequence and the C data bitonic sorting components, B being a positive integer greater than 1, and the B data bitonic sorting tasks being respectively associated with different data subsequences of B data subsequences, and the B to-be-sorted data subsequences being generated based on the data sequence; a component parallel operation module, configured to operate the C data bitonic sorting components in parallel according to the B data bitonic sorting tasks to obtain B data sorting subresults outputted by the C data bitonic sorting components, one data sorting subresult indicating a sorting result of one of the data subsequences associated with one of the data bitonic sorting tasks; and a result combination module, configured to combine the B data sorting subresults based on the C data bitonic sorting components to obtain a data sorting result for the data sequence.

The embodiments of the present disclosure provide a computer device, which includes: at least one processor, at least one memory, and a network interface. The at least one processor is connected to the at least one memory and the foregoing network interface. The foregoing network interface is configured to provide a data communication function, the at least one memory is configured to store a computer program, and the at least one processor is configured to invoke the foregoing computer program to cause the computer device to perform the data processing method according to the embodiments of the present disclosure.

The embodiments of the present disclosure provide a non-transitory computer-readable storage medium, which stores a computer program. The foregoing computer program is adapted to be loaded by a processor to perform the data processing method according to the embodiments of the present disclosure.

In the embodiments of the present disclosure, a computer device may generate multiple data bitonic sorting tasks for a to-be-sorted data sequence based on C data bitonic sorting components, and simultaneously execute the multiple data bitonic sorting tasks by operating the C data bitonic sorting components in parallel. By simultaneously executing the multiple data bitonic sorting tasks, the sorting time of the to-be-sorted data sequence may be reduced, that is, the task execution time may be reduced. Moreover, the computer device may combine B data sorting subresults based on the C data bitonic sorting components to obtain a data sorting result for the to-be-sorted data sequence. It can be seen from the above that according to the embodiments of the present disclosure, by operating the C data bitonic sorting components in parallel, the execution time of the sorting tasks for the to-be-sorted data sequence may be reduced, and the sorting efficiency of the sorting tasks may also be improved.

BRIEF DESCRIPTION OF THE DRAWINGS

In order to describe the technical solutions in the embodiments of the present disclosure or the related art more clearly, the drawings need to be used in the description of the embodiments or the related art will be briefly introduced below. Obviously, the drawings in the following description are only some embodiments of the present disclosure, and those of ordinary skill in the art may obtain other drawings according to these drawings without involving any inventive effort.

DESCRIPTION OF EMBODIMENTS

The technical solutions in the embodiments of the present disclosure will be clearly and completely described below with reference to the drawings in the embodiments of the present disclosure. Obviously, the described embodiments are only some but not all of the embodiments of the present disclosure. All other embodiments obtained by those of ordinary skill in the art based on the embodiments of the present disclosure without involving any inventive effort shall fall within the scope of protection of the present disclosure.

For ease of understanding, first, the following simple explanations are given for some nouns.

Artificial Intelligence (AI) is a theory, method, technology and application system that uses digital computers or machines controlled by digital computers to simulate, extend, and expand human intelligence, and perceive the environment, acquire knowledge, and use knowledge to obtain the best results. In other words, AI is a comprehensive technology in computer science that attempts to understand the essence of intelligence and produces a new intelligent machine that can react in a manner similar to human intelligence. AI is to study the design principles and implementation methods of various intelligent machines, to enable the machines to have the functions of perception, reasoning, and decision-making. The AI technology is a comprehensive discipline that involves a wide range of fields including both hardware-level technologies and software-level technologies. Basic AI technologies generally include technologies such as a sensor, a dedicated AI chip, cloud computing, distributed storage, a big data processing technology, an operating/interaction system, and electromechanical integration. AI software technologies mainly include a computer vision technology, a speech processing technology, a natural language processing technology, and several major directions such as machine learning/deep learning, automatic driving, and smart transport.

Figure 1:
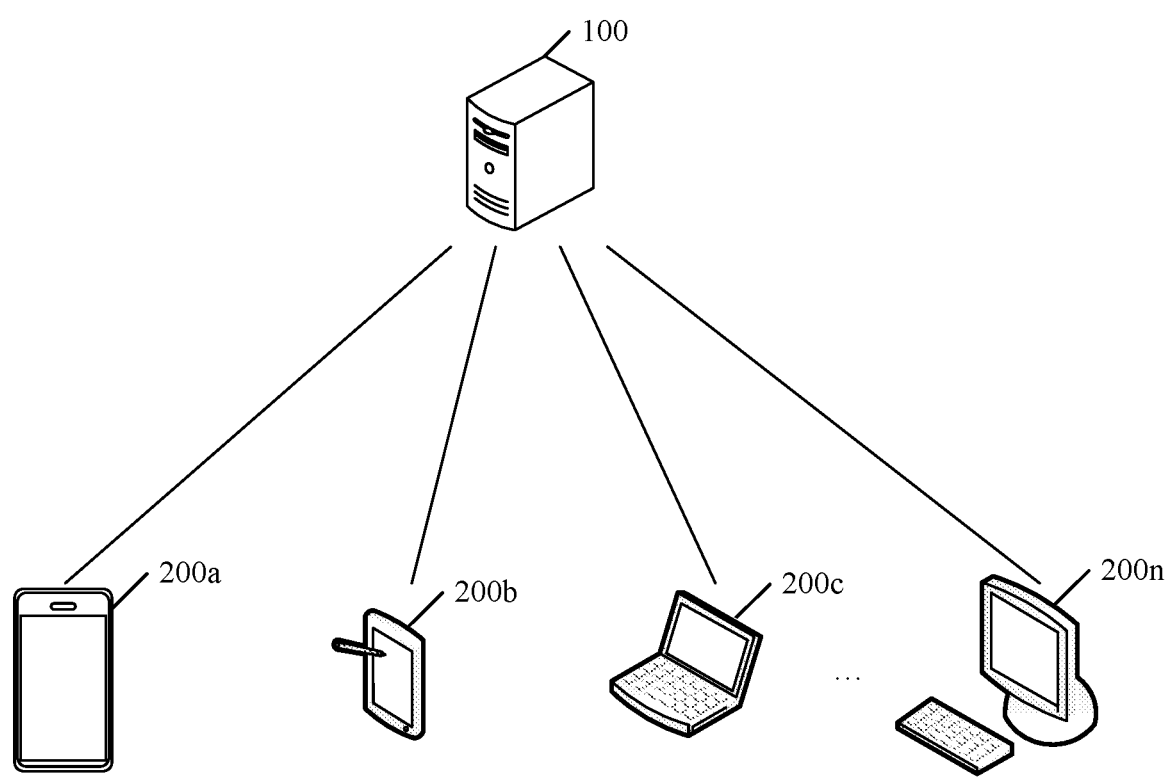
FIG. 1 is a schematic diagram of a system architecture according to an embodiment of the present disclosure.

FIG. 1 is a schematic diagram of a system architecture according to an embodiment of the present disclosure. As shown in FIG. 1, a system may include a service server 100 and a terminal cluster that may include: a terminal device 200a, a terminal device 200b, a terminal device 200c, . . . , and a terminal device 200n. It will be appreciated that the foregoing system may include one or more terminal devices, and a quantity of terminal devices will not be defined herein.

There may be communication connections in the terminal cluster. For example, there is a communication connection between the terminal device 200a and the terminal device 200b, and there is a communication connection between the terminal device 200a and the terminal device 200c. Meanwhile, there may be a communication connection between any terminal device in the terminal cluster and the service server 100. For example, there is a communication connection between the terminal device 200a and the service server 100. A connection mode of the foregoing communication connection is not defined, and the communication connection may be a direct or indirect connection in a wired communication mode, or in a wireless communication mode, or in other modes, which is be not defined herein.

It is to be understood that each terminal device in the terminal cluster shown in FIG. 1 may be installed with an application client that, when running on the terminal device, may perform data interaction, that is, the foregoing communication connection, with the foregoing service server 100 shown in FIG. 1. The application client may be an application client with a data sorting function, such as a short-video application, a video application, a live-streaming application, a social application, an instant messaging application, a game application, a music application, a shopping application, a novel application, and a browser. The application client may be an independent client or an embedded subclient that is integrated in a certain client (such as a social client, an education client, and a multimedia client), which is not defined herein.

In order to facilitate subsequent understanding and description, in the embodiments of the present disclosure, a terminal device may be selected from the terminal cluster shown in FIG. 1 as a target terminal device. For example, the terminal device 200a is taken as the target terminal device. When acquiring a to-be-sorted data sequence and receiving a data sorting instruction for the to-be-sorted data sequence, the terminal device 200a may transmit a data sorting request for the to-be-sorted data sequence to the service server 100. After receiving the data sorting request transmitted by the terminal device 200a, the service server 100 may invoke C data bitonic sorting components through the data sorting request. The data sorting request carries a first total quantity of to-be-sorted data in the to-be-sorted data sequence, and C is a positive integer greater than 1, that is, at least two data bitonic sorting components are invoked. The service server 100 may initiate B data bitonic sorting tasks according to the first total quantity and data storage capacities respectively corresponding to the C data bitonic sorting components. B is a positive integer greater than 1, that is, at least two data bitonic sorting tasks are initiated. The B data bitonic sorting tasks are respectively associated with different to-be-sorted data subsequences, and all the B to-be-sorted data subsequences are generated based on the to-be-sorted data sequence. The service server 100 may operate the C data bitonic sorting components in parallel according to the B data bitonic sorting tasks to obtain B data sorting subresults outputted by the C data bitonic sorting components. One data sorting subresult indicates a sorting result of the to-be-sorted data subsequence associated with one data bitonic sorting task. The service server 100 may combine the B data sorting subresults based on the C data bitonic sorting components to obtain a data sorting result for the to-be-sorted data sequence, and finally store the data sorting result into a write address carried in the data sorting request.

In some embodiments, if the terminal device 200a locally stores the foregoing C data bitonic sorting components, the terminal device 200a may perform bitonic sorting on the to-be-sorted data in the to-be-sorted data sequence through the local C data bitonic sorting components. It will be appreciated that the process is consistent with the foregoing process of performing bitonic sorting on the to-be-sorted data in the to-be-sorted data sequence by the service server through the C data bitonic sorting components, which may refer to the foregoing description and is not described in detail here.

It will be appreciated that the system architecture may include multiple service servers, one terminal device may be connected to one service server, and each service server may acquire a data sorting request that is transmitted by a terminal device connected to the service server, so that the service server may perform bitonic sorting on a to-be-sorted data sequence to which the acquired data sorting request is directed, and return a data sorting result to the terminal device connected to the service server.

The method according to the embodiments of the present disclosure may be applied to a circuit such as an application specific integrated circuit (ASIC) and a field programmable gate array (FPGA). The circuit may be applied to a chip. The foregoing chip may be integrated in a central processing unit (CPU), an AI chip, or other types of chips. The AI chip is integrated in a service server in the form of a peripheral component interconnect express (PCIE) board.

It will be appreciated that the method according to the embodiments of the present disclosure may be performed by a computer device, which includes, but is not limited to, a terminal device and a service server. The service server may be an independent physical server, a server cluster or distributed system composed of multiple physical servers, or a cloud server providing basic cloud computing services such as a cloud database, a cloud service, cloud computing, a cloud function, cloud storage, a network service, cloud communication, a middleware service, a domain name service, a security service, a content delivery network (CDN), and a big data and artificial intelligence platform. The terminal device includes, but is not limited to, a mobile phone, a computer, an intelligent voice interaction device, a smart household appliance, an on-board terminal, and the like. The terminal device and the service server may be connected directly or indirectly in a wired or wireless mode, which is not defined herein.

It will be appreciated that the foregoing system architecture is applicable to data sorting scenarios such as a database, target recognition, and text analysis, and specific service scenarios are not listed one by one herein.

Figure 2:
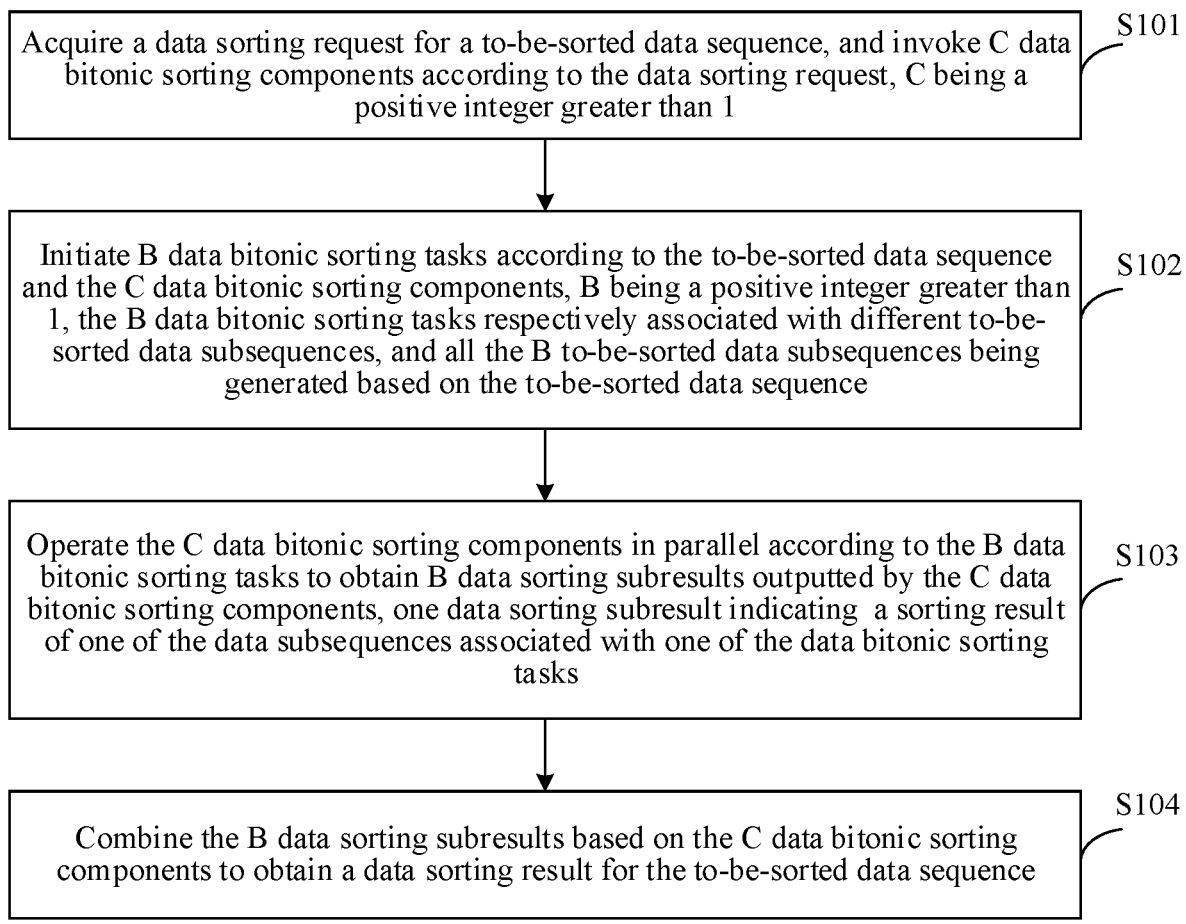
FIG. 2 is a schematic flowchart of a data processing method according to an embodiment of the present disclosure.

FIG. 2 is a schematic flowchart of a data processing method according to an embodiment of the present disclosure, which may be performed by a service server (such as the foregoing service server 100 shown in FIG. 1) or a terminal device (such as the foregoing terminal device 200a shown in FIG. 1), or may also be alternately performed by the service server and the terminal device. For ease of understanding, in the embodiments of the present disclosure, a description is made by taking a case where the method is performed by a service server as an example. In addition, the embodiments of the present disclosure may be applied to various scenarios, which include, but are not limited to, cloud technologies, artificial intelligence, smart transport, aided driving, and the like. As shown in FIG. 2, the data processing method may include the following steps S101 to S104.

Step S101: Acquire a data sorting request for a to-be-sorted data sequence, and invoke C data bitonic sorting components according to the data sorting request, C being a positive integer greater than 1.

In the embodiments of the present disclosure, the data sorting request is required and transmitted to a task control component. The data sorting request carries a first total quantity of to-be-sorted data in the to-be-sorted data sequence.

In the embodiments of the present disclosure, the to-be-sorted data sequence may be an unordered data sequence, such as a sequence (0, 5, 2, 6, 8, 7, 6). The to-be-sorted data sequence may be a bitonic sequence, such as a sequence (0, 2, 6, 9, 8, 7, 4, 1). A sequence type of the to-be-sorted data sequence is not defined herein. It will be appreciated that the first total quantity of to-be-sorted data in the to-be-sorted data sequence is equal to or greater than 3.

In the embodiments of the present disclosure, the data sorting request may be transmitted by a terminal device to the service server, as shown in FIG. 1, or may also be locally generated by the service server. A source of the data sorting request is not defined herein. The data sorting request may carry the to-be-sorted data in the to-be-sorted data sequence, and the service server may determine the first total quantity according to the to-be-sorted data in the to-be-sorted data sequence. Or, the data sorting request carries read addresses respectively corresponding to the to-be-sorted data in the to-be-sorted data sequence and the first total quantity, and the service server may read the to-be-sorted data in the to-be-sorted data sequence from the read addresses. Data carried in the data sorting request is not defined herein, which may be set according to actual applications. In the embodiments of the present disclosure, the data bitonic sorting component refers to a component capable of performing bitonic sorting on the to-be-sorted data sequence.

Figure 3:
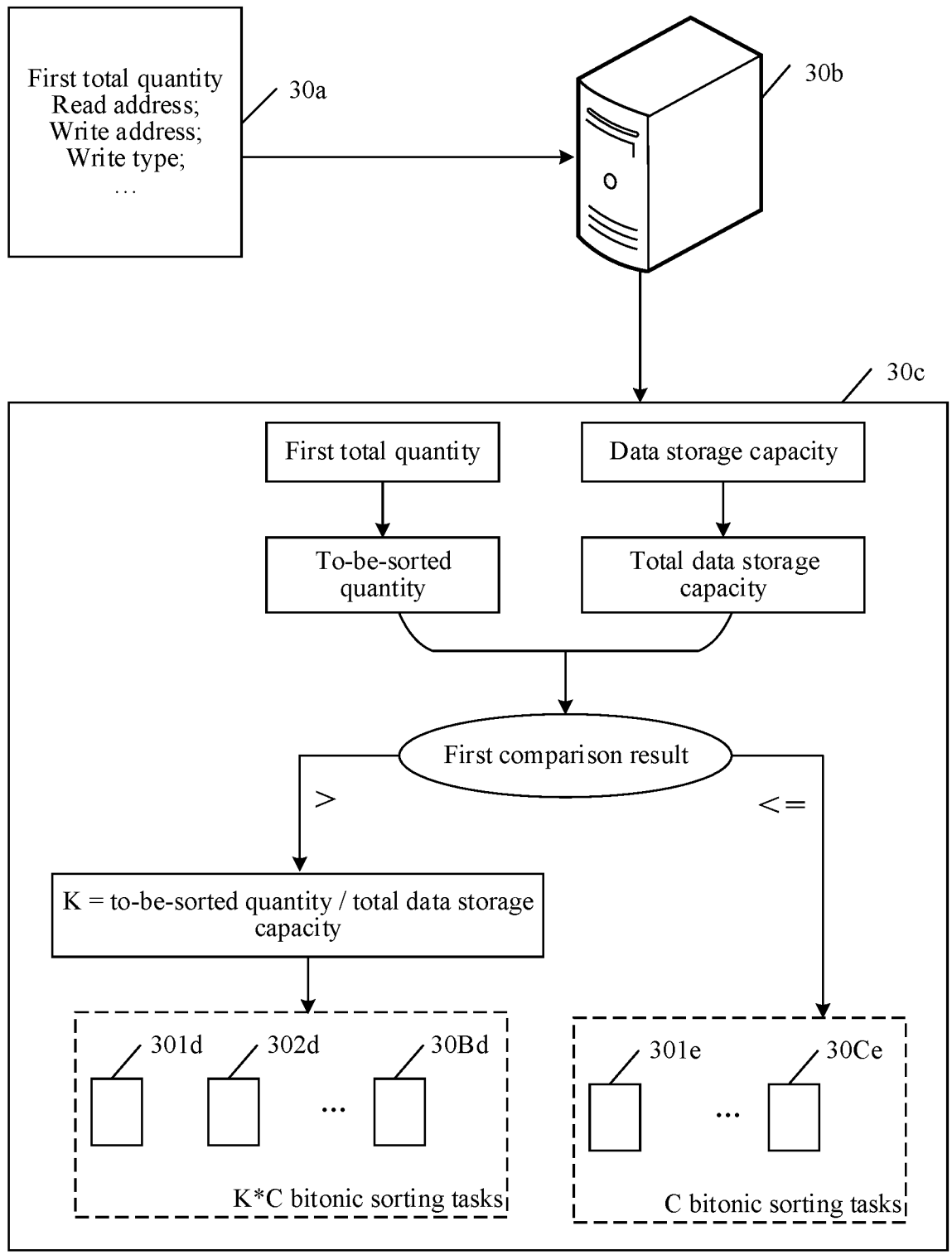
FIG. 3 is a schematic diagram of a scene of data processing according to an embodiment of the present disclosure.

Referring to FIG. 3 together, FIG. 3 is a schematic diagram of a scene of data processing according to an embodiment of the present disclosure. As shown in FIG. 3, a data sorting request 30a includes a first total quantity, a read address, a write address, a write type, and the like. The write address is used for instructing a service server 30b to store a data sorting result into the address, and the write type is used for indicating whether a result type stored into the write address is a data result type or an index result type, which may refer to the following description of step S104 and is not described in detail here.

Figure 6:
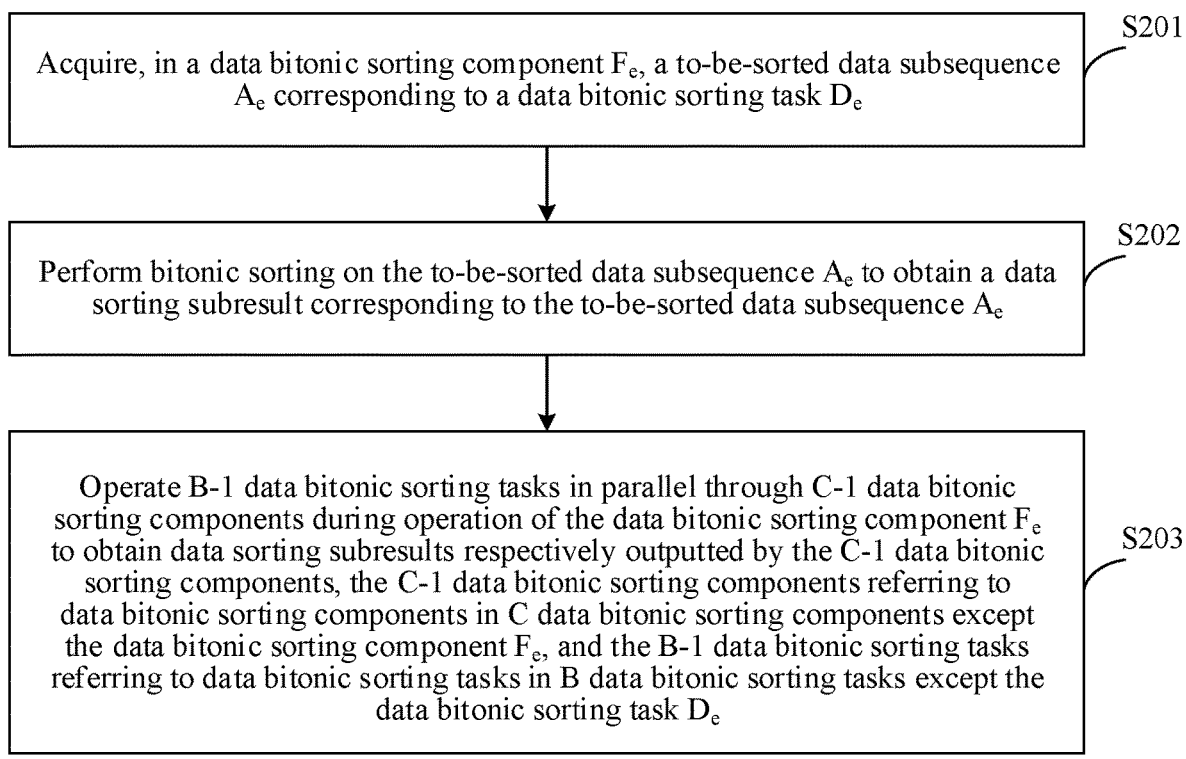
FIG. 6 is a schematic flowchart of another data processing method according to an embodiment of the present disclosure.

After acquiring the data sorting request 30a, the service server 30b may invoke C (at least two) data bitonic sorting components according to the data sorting request 30a, which may refer to the following description of an inner structure of a data bitonic sorting component in an embodiment corresponding to FIG. 6 and is not described in detail here. It will be appreciated that in actual applications, the first total quantity may be equal to 2, or may also be a positive integer greater than 2. The embodiments of the present disclosure may be applied to a scenario where a to-be-sorted data sequence is sorted by using one data bitonic sorting component.

Step S102: Initiate B data bitonic sorting tasks according to the to-be-sorted data sequence and the C data bitonic sorting components, B being a positive integer greater than 1, and the B data bitonic sorting tasks being respectively associated with different to-be-sorted data subsequences, and all the B to-be-sorted data subsequences being generated based on the to-be-sorted data sequence.

In the task control component, a to-be-sorted quantity associated with the first total quantity is determined. The to-be-sorted quantity is equal to or greater than the first total quantity. Data storage capacities respectively corresponding to the C data bitonic sorting components are acquired, and the to-be-sorted quantity is compared with a total data storage capacity to obtain a first comparison result. The total data storage capacity is equal to the sum of the C data storage capacities. The B data bitonic sorting tasks are initiated according to the first comparison result.

Here, a process of initiating the B data bitonic sorting tasks according to the first comparison result may include the following steps. If the first comparison result is that the to-be-sorted quantity is greater than the total data storage capacity, a first quantity ratio of the to-be-sorted quantity to the total data storage capacity is acquired. The B data bitonic sorting tasks are initiated according to the first quantity ratio. A product of C and the first quantity ratio is equal to B. A second total quantity carried in one data bitonic sorting task is equal to the data storage capacity. The second total quantity indicates a total quantity of to-be-sorted data in the to-be-sorted data subsequence associated with one data bitonic sorting task. If the first comparison result is that the to-be-sorted quantity is less than or equal to the total data storage capacity, the B data bitonic sorting tasks are initiated according to the C data bitonic sorting components. B is equal to C.

Referring to FIG. 3 again, the service server 30b transmits the data sorting request 30a to a top-level control component, and the top-level control component transmits the data sorting request 30a to a task control component 30c. It may also be understood as that after configuring data carried in the data sorting request and the task control component 30c, the top-level control component transmits a data sorting instruction (sort request) for the to-be-sorted data sequence to the task control component 30c.

In the task control component 30c, the service server 30b determines the to-be-sorted quantity associated with the first total quantity. For example, the first total quantity corresponding to the to-be-sorted data sequence is 31, and 31 is closest to the 5th power of 2, so the to-be-sorted quantity is 25, that is, 32. In the embodiments of the present disclosure, the first total quantity is an integer greater than 2, and the to-be-sorted quantity is equal to or greater than the first total quantity, and is a power of 2. The service server 30b acquires the data storage capacities respectively corresponding to the C data bitonic sorting components. Usually, in order not to increase the complexity of parameter configuration, the C data storage capacities are consistent, for example, are 32. If all the C data storage capacities are 32, the total data storage capacity is 32*C. Further, the to-be-sorted quantity is compared with the total data storage capacity to obtain the first comparison result. The foregoing examples are just for ease of description and understanding.

Referring to FIG. 3 again, if the first comparison result is that the to-be-sorted quantity is greater than the total data storage capacity, the service server 30b acquires the first quantity ratio of the to-be-sorted quantity to the total data storage capacity, such as a ratio K shown in FIG. 3. For example, the data storage capacity corresponding to one data bitonic sorting component is 8, C is equal to 4, the total data storage capacity is equal to 32, and if the to-be-sorted quantity is 64, K is equal to 2. In this case, the second total quantity carried in one data bitonic sorting task is set as the data storage capacity, that is, the total quantity of to-be-sorted data in the to-be-sorted data subsequence associated with one data bitonic sorting task is equal to the data storage capacity. Obviously, the service server 30b needs to initiate 8 data bitonic sorting tasks through the task control component 30c.

If the first comparison result is that the to-be-sorted quantity is less than or equal to the total data storage capacity, for example, the data storage capacity corresponding to one data bitonic sorting component is 64, C is equal to 4, the total data storage capacity is equal to 256, and if the to-be-sorted quantity is 64, obviously, in this case, 4 data bitonic sorting tasks are initiated to sort the to-be-sorted data in the to-be-sorted data sequence in one round of operation. The second total quantity associated with one data bitonic sorting task is equal to a ratio of the to-be-sorted quantity to C, that is, 64/4. The foregoing examples are just for ease of description and understanding.

Based on the above, the task control component 30c parses parameters (including a first total quantity, a data storage capacity, and the like), divides a sorting task for a to-be-sorted data sequence into sorting subtasks (that is, data bitonic sorting tasks) whose quantity is equal to that of data bitonic sorting components, and transmits one data bitonic sorting task to one sort unit (that is, a data bitonic sorting component). In addition, in the embodiments of the present disclosure, a storage region (that is, a data storage capacity) allocated to each sort unit is also taken into account. In a situation where a total data storage capacity is less than a to-be-sorted quantity, the sorting task may also be divided into K*C subtasks (that is, data bitonic sorting tasks) and completed in k rounds of operation, and C subtasks are transmitted in each round, that is, one data bitonic sorting task is transmitted to one sort unit. After transmitting the data bitonic sorting tasks, the task control component 30c waits for a task completion signal.

Step S103: Operate the C data bitonic sorting components in parallel according to the B data bitonic sorting tasks to obtain B data sorting subresults outputted by the C data bitonic sorting components, one data sorting subresult indicating a sorting result of one of the data subsequences associated with one of the data bitonic sorting tasks.

In the embodiments of the present disclosure, if B is equal to C, the B data bitonic sorting tasks are distributed to the C data bitonic sorting components. One data bitonic sorting task is distributed to one data bitonic sorting component. The B data bitonic sorting tasks are operated in parallel through the C data bitonic sorting components to obtain data sorting subresults respectively outputted by the C data bitonic sorting components. The B data bitonic sorting tasks include a data bitonic sorting task $D_e$, and e is a positive integer less than or equal to B. The B to-be-sorted data subsequences include a to-be-sorted data subsequence $A_e$ corresponding to the data bitonic sorting task $D_e$. The C data bitonic sorting components include a data bitonic sorting component $F_e$ configured to execute the data bitonic sorting task $D_e$.

If B is greater than C, the B data bitonic sorting tasks are divided into K*C data bitonic sorting tasks. K is the maximum rounds of operation respectively corresponding to the C data bitonic sorting components. C data bitonic sorting tasks in an $i^{th}$ round of operation are distributed to the C data bitonic sorting components. One data bitonic sorting task is distributed to one data bitonic sorting component. i is a positive integer less than or equal to K. The C data bitonic sorting tasks in the $i^{th}$ round of operation are operated in parallel through the C data bitonic sorting components to obtain data sorting subresults respectively outputted by the C data bitonic sorting components, and the data sorting subresults respectively corresponding to the B data bitonic sorting tasks are obtained when i is equal to K.

It can be seen from step S102 that there are two situations where a data bitonic sorting task is initiated. One is that the to-be-sorted quantity is less than or equal to the total data storage capacity, that is, B=C, and in this situation, data bitonic sorting tasks whose quantity is equal to that of the data bitonic sorting components, that is, C data bitonic sorting tasks, are initiated. The other one is that the to-be-sorted quantity is greater than the total data storage capacity, and in this situation, K*C data bitonic sorting tasks are initiated and executed by operating the C data bitonic sorting components in parallel for K rounds. It will be appreciated that a process of operating the data bitonic sorting components for a single round in a situation where the to-be-sorted quantity is greater than the total data storage capacity is consistent with a process of operating the data bitonic sorting components in parallel in a situation where the to-be-sorted quantity is less than or equal to the total data storage capacity. A difference between the two processes is that in the former process, after the C data bitonic sorting components are operated in parallel for a single round, C data sorting subresults generated in the single round need to be stored into an external memory and are used for execution of C data bitonic sorting tasks in a next round, and in the later process, the C data sorting subresults do not need to be stored into the external memory and are directly combined to obtain a data sorting result corresponding to the to-be-sorted data. Therefore, in the embodiments of the present disclosure, only the situation where B is equal to C is described, and the situation where B is greater than C may refer to the following description.

Figure 4:
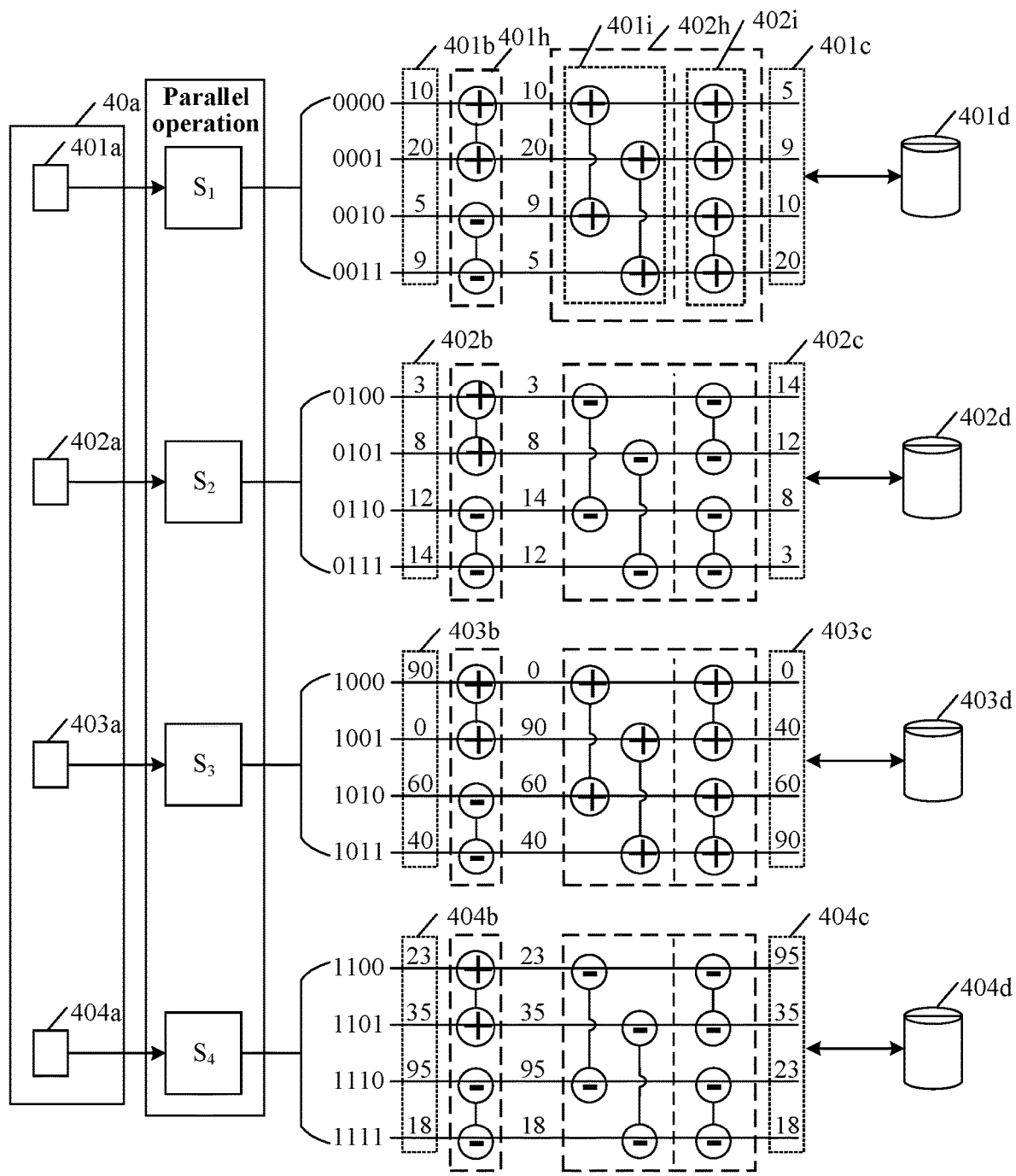
FIG. 4 is a schematic diagram of a scene of another data processing according to an embodiment of the present disclosure.

Referring to FIG. 4 together, FIG. 4 is a schematic diagram of a scene of another data processing according to an embodiment of the present disclosure. As shown in FIG. 4, in the embodiments of the present disclosure, C is set as 4, a task control component 40a initiates 4 data bitonic sorting tasks, that is, a data bitonic sorting task 401a, a data bitonic sorting task 402a, a data bitonic sorting task 403a, and a data bitonic sorting task 404a shown in FIG. 4, and a service server invokes 4 data bitonic sorting components, that is, a data bitonic sorting component $S_1$, a data bitonic sorting component $S_2$, a data bitonic sorting component $S_3$, and a data bitonic sorting component $S_4$ shown in FIG. 4. A process of acquiring to-be-sorted data subsequences by the data bitonic sorting components according to received data bitonic sorting tasks refers to the following embodiment corresponding to FIG. 6, which is not described in detail here. Referring to FIG. 4 again, the data bitonic sorting component $S_1$ executes the data bitonic sorting task 401a, and a to-be-sorted data subsequence 401b corresponding to the data bitonic sorting task 401a is (10, 20, 5, 9). The data bitonic sorting component $S_2$ executes the data bitonic sorting task 402a, and a to-be-sorted data subsequence 402b corresponding to the data bitonic sorting task 402a is (3, 8, 12, 14). The data bitonic sorting component $S_3$ executes the data bitonic sorting task 403a, and a to-be-sorted data subsequence 403b corresponding to the data bitonic sorting task 403a is (90, 0, 60, 40). The data bitonic sorting component $S_4$ executes the data bitonic sorting task 404a, and a to-be-sorted data subsequence 404b corresponding to the data bitonic sorting task 404a is (23, 35, 95, 18). In the embodiments of the present disclosure, the service server may first generate a unique index identifier corresponding to each piece of to-be-sorted data in sequence for each piece of to-be-sorted data in the to-be-sorted data sequence, and a form of the index identifier is not defined herein, which may be any kind of information that can be used for identifying each piece of to-be-sorted data in the to-be-sorted data sequence. For ease of description and understanding, in the present disclosure, 4-bit binary is taken as an example. As shown in FIG. 4, an index identifier of 10 is 0000, an index identifier of 20 is 0001, an index identifier of 5 is 0010, an index identifier of 9 is 0011, an index identifier of 3 is 0100, an index identifier of 8 is 0101, an index identifier of 12 is 0110, an index identifier of 14 is 0111, an index identifier of 90 is 1000, an index identifier of 0 is 1001, an index identifier of 60 is 1010, an index identifier of 40 is 1011, an index identifier of 23 is 1100, an index identifier of 35 is 1101, an index identifier of 95 is 1110, and an index identifier of 18 is 1111.

Referring to FIG. 4 again, the service server operates the B (such as 4 shown in FIG. 4) data bitonic sorting tasks in parallel through the C (such as 4 shown in FIG. 4) data bitonic sorting components to obtain data sorting subresults respectively outputted by the C data bitonic sorting components. It will be appreciated that one bitonic sorting component executes one data bitonic sorting task, and the sorting logic of each data bitonic sorting component is consistent. Therefore, a description is made by taking a case where the data bitonic sorting component $S_1$ executes the data bitonic sorting task 401a as an example, and the execution process of the remaining data bitonic sorting components may refer to the following description, which is not described in detail here. In the embodiments of the present disclosure, to-be-sorted data (original to-be-sorted data) respectively corresponding to two index identifiers are compared, and the to-be-sorted data (to-be-sorted data subjected to comparison) respectively corresponding to the two index identifiers are updated according to a comparison result.

In FIG. 4, a symbol "s" represents ascending order, two connected "s" represent that to-be-sorted data respectively corresponding to two connected index identifiers are sorted in ascending order, a symbol "0" represents descending order, and two connected "0" represent that to-be-sorted data respectively corresponding to two connected index identifiers are sorted in descending order. As shown in FIG. 4, in the data bitonic sorting component $S_1$, the to-be-sorted data subsequence 401b is (10, 20, 5, 9), so the second total quantity is equal to 4, and there are two bitonic sorting phases such as a first bitonic sorting phase 401h and a second bitonic sorting phase 402 h shown in FIG. 4. Moreover, in the second bitonic sorting phase 402h, there are two rounds of sorting such as a first round of sorting 401i and a second round of sorting 402i shown in FIG. 4. In the first bitonic sorting phase 401h, logical parameters of one round of sorting include an ascending comparison of the index identifier 0000 and the index identifier 0001 and a descending comparison of the index identifier 0010 and the index identifier 0011, so an output result of the first bitonic sorting phase 401h is that the index identifier 0000 is updated to the to-be-sorted data 10, the index identifier 0001 is updated to the to-be-sorted data 20, the index identifier 0010 is updated to the to-be-sorted data 9, and the index identifier 0011 is updated to the to-be-sorted data 5. In this case, the service server stores the foregoing output result into a storage component 401*d* corresponding to the data bitonic sorting component $S_1$, and initiates the second bitonic sorting phase 402*h* after successfully storing the output result into the storage component 401*d*.

Referring to FIG. 4 again, in the second bitonic sorting phase 402*h*, logical parameters of the first round of sorting 401*i* includes an ascending comparison of the index identifier 0000 and the index identifier 0010 and an ascending comparison of the index identifier 0001 and the index identifier 0011, so an output result of the first round of sorting 401*i* is that the index identifier 0000 is updated to the to-be-sorted data 9, the index identifier 0010 is updated to the to-be-sorted data 10, the index identifier 0001 is updated to the to-be-sorted data 5, and the index identifier 0011 is updated to the to-be-sorted data 20. In this case, the service server caches the output result of the first round of sorting 401*i* into a data acquisition subcomponent of the data bitonic sorting component $S_1$ instead of storing the output result into the storage component 401*d*. Therefore, when the second round of sorting 402*i* is initiated, the data bitonic sorting component $S_1$ may directly acquire the output result of the previous round of sorting from the local data acquisition subcomponent instead of acquiring the output result from the storage component 401*d*.

Referring to FIG. 4 again, logical parameters of the second round of sorting 402*i* include an ascending comparison of the index identifier 0000 and the index identifier 0001 and an ascending comparison of the index identifier 0010 and the index identifier 0011, so an output result of the second round of sorting 402*i* is that the index identifier 0000 is updated to the to-be-sorted data 5, the index identifier 0001 is updated to the to-be-sorted data 9, the index identifier 0010 is updated to the to-be-sorted data 10, and the index identifier 0011 is updated to the to-be-sorted data 20. The second bitonic sorting phase 402*h* ends, and at this moment, the service server stores the output result (that is, a data sorting subresult 401*c* in FIG. 4) of the second round of sorting 402*i* into the storage component 401*d*. The storage component 401*d*, a storage component 402*d*, a storage component 403*d*, and a storage component 404*d* shown in FIG. 4 are local memories of the data bitonic sorting components.

According to the foregoing sorting process, an output result corresponding to the data bitonic sorting component $S_1$ is the data sorting subresult 401*c*, an output result corresponding to the data bitonic sorting component $S_2$ is a data sorting subresult 402*c*, an output result corresponding to the data bitonic sorting component $S_3$ is a data sorting subresult 403*c*, and an output result corresponding to the data bitonic sorting component $S_4$ is a data sorting subresult 404*c*.

After sorting is completed, the sort unit stores an output result into a memory, and transmits a sorting completion signal to the task control component 40*a* to indicate that the data bitonic sorting task is completed.

Step S104: Combine the B data sorting subresults based on the C data bitonic sorting components to obtain a data sorting result for the to-be-sorted data sequence.

In the embodiments of the present disclosure, U data sorting subresult pairs are obtained during an $L^{th}$ combination, U is a positive integer, and L is a positive integer. If L is 1, the U data sorting subresult pairs are generated based on the B data sorting subresults. If L is not 1, the U data sorting subresult pairs are generated based on a historical combined data sorting subresult, and the historical combined data sorting subresult is a subresult obtained during a $(L-1)^{th}$ combination. The U data sorting subresult pairs are combined based on the C data bitonic sorting components to obtain U target combined data sorting subresults. If U is equal to 1, the U target combined data sorting subresults are determined as the data sorting result corresponding to the to-be-sorted data sequence. If U is greater than 1, during a $(L+1)^{th}$ combination, the U target combined data sorting subresults are combined based on the C data bitonic sorting components to obtain the data sorting result for the to-be-sorted data sequence. The U data sorting subresult pairs include a data sorting subresult pair $M_p$, and p is a positive integer less than or equal to U.

After receiving completion signals for all the subtasks (the data bitonic sorting tasks), the task control component initiates a combination instruction for the C data sorting subresults. Similarly, the service server invokes the sort unit to complete, which is consistent with the sorting process in step S103. A difference between the two processes is that the to-be-sorted data subsequences may be unordered sequences, and sequences corresponding to the data sorting subresults are ordered sequences.

According to the data processing method provided in the embodiments of the present disclosure, during a data read/write operation, a data sorting request for a to-be-sorted data sequence corresponding to the data read/write operation may be acquired, and then steps S101 to S104 are performed in response to the data sorting request to perform data sorting on the to-be-sorted data sequence. Here, the data read/write operation may be a read operation or a write operation that is performed in any target application installed in a terminal device, and the to-be-sorted data sequence is read data corresponding to the read operation or written data corresponding to the write operation.

The data processing method according to the embodiments of the present disclosure may be at least applied to the following scenario. In response to that stored data needs to be read from a cloud memory through a service server of a target application, a read operation may be performed at a client of the target application, and the service server acquires stored data corresponding to the read operation from the cloud memory in response to the read operation, that is, obtains the foregoing to-be-sorted data sequence. After the foregoing to-be-sorted data sequence is obtained, according to the method provided in the embodiments of the present disclosure, a data sorting request for the to-be-sorted data sequence may be transmitted through the client of the target application in the terminal device to the service server. The service server invokes C data bitonic sorting components in response to the data sorting request, initiates B data bitonic sorting tasks according to the to-be-sorted data sequence and the C data bitonic sorting components, and operates the C data bitonic sorting components in parallel to obtain B data sorting subresults outputted by the C data bitonic sorting components. Then, the service server combines the B data sorting subresults based on the C data bitonic sorting components to obtain a data sorting result for the to-be-sorted data sequence, thereby completing data sorting for the to-be-sorted data sequence acquired from the cloud memory.

In the present disclosure scenario, the read operation requesting to read data from the cloud memory may request to read multiple pieces of data, and there may be multiple read operations for different data. Therefore, read stored data is multiple pieces of unordered data. In order to ensure that the read stored data can be sorted in a preset order to form ordered data, data sorting may be performed by the method according to the embodiments of the present disclosure.

Moreover, according to the embodiments of the present disclosure, during data sorting, multiple data bitonic sorting components are operated in parallel, so that the execution time of the sorting tasks for the to-be-sorted data sequence (that is, the read stored data) may be reduced, and the sorting efficiency of the sorting tasks may be improved.

The data processing method according to the embodiments of the present disclosure may further be applied to the following scenario. A shopping application is installed in the terminal device, a user performs a pull-to-refresh operation at a client of the shopping application, and a service server recalls a preset quantity of product information from a product database as to-be-recommended information in response to the pull-to-refresh operation. The preset quantity of product information constitutes the foregoing to-be-sorted data sequence. Before recommending the product information, the service server may perform data sorting on the to-be-sorted data sequence corresponding to the preset quantity of product information by the sorting method according to the embodiments of the present disclosure. In one embodiment, a data sorting request for the to-be-sorted data sequence may be transmitted to the service server through the client of the shopping application. The service server invokes C data bitonic sorting components in response to the data sorting request, initiates B data bitonic sorting tasks according to the to-be-sorted data sequence and the C data bitonic sorting components, and operates the C data bitonic sorting components in parallel to obtain B data sorting subresults outputted by the C data bitonic sorting components. Then, the service server combines the B data sorting subresults based on the C data bitonic sorting components to obtain a data sorting result for the to-be-sorted data sequence, thereby completing data sorting for the to-be-sorted data sequence corresponding to the preset quantity of product information.

In the present disclosure scenario, there is a certain difference among the preset quantity of product information recalled from the product database, and data corresponding to the multiple pieces of product information is unordered data. Therefore, in order to recommend accurate information to the user, data sorting may be performed on the to-be-sorted data sequence, and information is recommended based on a sorting result of the data sorting, thereby recommending accurate information that meets user experience to the user. Moreover, during data sorting, the execution time of the sorting tasks for the to-be-sorted data sequence may be reduced, and the sorting efficiency of the sorting tasks may be improved.

The data processing method according to the embodiments of the present disclosure may further be applied to the following scenario. In the smart transport field, the terminal device is an on-board terminal that is installed with a navigation application, a service server of the navigation application generates navigation information based on inputted starting point and destination information in response to a navigation request, and the navigation information includes, but is not limited to, at least one of: multiple pieces of position information, estimated arrival time for each piece of position information, a current road condition corresponding to each piece of position information, and the like. All data in the navigation information constitute the foregoing to-be-sorted data sequence. Before real-time navigation, data sorting may be performed on the to-be-sorted data sequence corresponding to the navigation information by the sorting method according to the embodiments of the present disclosure. In one embodiment, a data sorting request for the to-be-sorted data sequence may be transmitted to the service server through a client of the navigation application. The service server invokes C data bitonic sorting components in response to the data sorting request, initiates B data bitonic sorting tasks according to the to-be-sorted data sequence and the C data bitonic sorting components, and operates the C data bitonic sorting components in parallel to obtain B data sorting subresults outputted by the C data bitonic sorting components. Then, the service server combines the B data sorting subresults based on the C data bitonic sorting components to obtain a data sorting result for the to-be-sorted data sequence, thereby completing data sorting for the to-be-sorted data sequence corresponding to the navigation information.

In the present disclosure scenario, there is a certain difference among the multiple pieces of data in the generated navigation information, and the multiple pieces of data in the navigation information is unordered data. Therefore, in order to provide accurate real-time navigation for a user, data sorting may be performed on the to-be-sorted data sequence, and real-time navigation is performed based on a sorting result of the data sorting, thereby providing accurate navigation experience that meets user's navigation requirements for the user. Moreover, during data sorting, the execution time of the sorting tasks for the to-be-sorted data sequence may be reduced, and the sorting efficiency of the sorting tasks may be improved.

Figure 5:
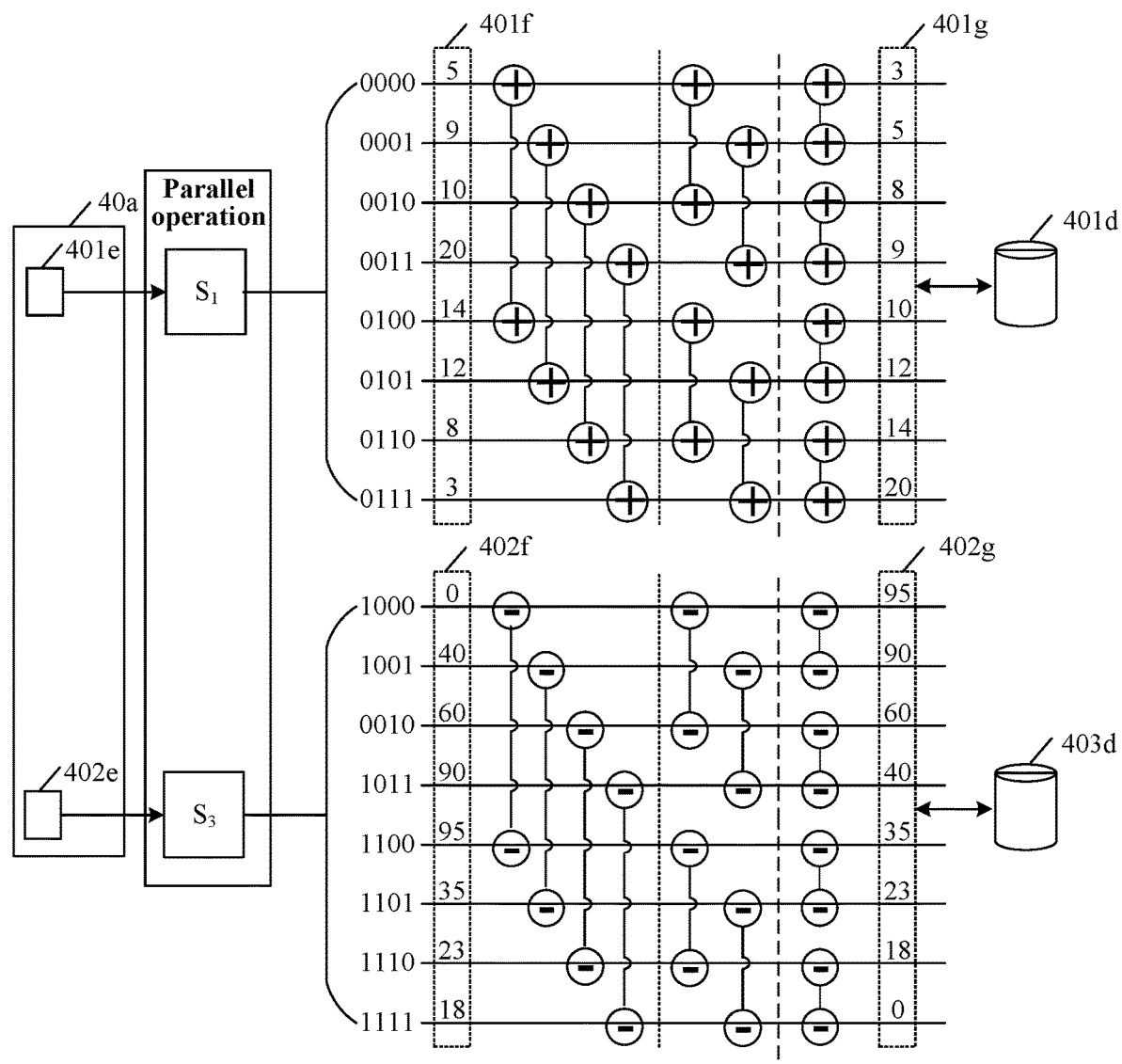
FIG. 5 is a schematic diagram of a scene of still another data processing according to an embodiment of the present disclosure.

Next, referring to FIG. 5 and FIG. 4 together, FIG. 5 is a schematic diagram of a scene of still another data processing according to an embodiment of the present disclosure. As shown in FIG. 5, the service server may acquire 2 data sorting subresult pairs for the 4 data sorting subresults shown in FIG. 4. As shown in FIG. 5, a data sorting subresult pair 401$f$ is generated from the data sorting subresult 401$c$ and the data sorting subresult 402$c$; and a data sorting subresult pair 402$f$ is generated from the data sorting subresult 403$c$ and the data sorting subresult 404$c$.

The service server initiates two data combination tasks, such as a data combination task 401$e$ and a data combination task 402$e$ in FIG. 5, through the task control component 40$a$. The data combination task 401$e$ refers to a task of combining the data sorting subresult 401$c$ with the data sorting subresult 402$c$, and the data combination task 402$e$ is a task of combining the data sorting subresult 403$c$ with the data sorting subresult 404$c$.

If the data storage capacity is greater than or equal to a fourth total quantity of to-be-sorted data associated with the data sorting subresult pair, the task control component 40$a$ may distribute the data combination task 401$e$ to one or two of two data bitonic sorting components associated with the data sorting subresult pair 401$f$, that is, the bitonic sorting component $S_1$ and the bitonic sorting component $S_2$ shown in FIG. 4. In the embodiments of the present disclosure, the task control component 40$a$ distributes the data combination task 401$e$ to one (the bitonic sorting component $S_1$ shown in FIG. 5) of the two data bitonic sorting components associated with the data sorting subresult pair 401$f$. A case where the data storage capacity is less than the fourth total quantity of to-be-sorted data associated with the data sorting subresult pair refers to the following description of an embodiment corresponding to FIG. 8, which is not described in detail here.

Referring to FIG. 4 and FIG. 5 together, in the data bitonic sorting component $S_1$, the data sorting subresult pair 401$f$ is a bitonic sequence, which includes (5, 9, 10, 20, 14, 12, 8, 3), so the fourth total quantity is equal to 8, there are three rounds of sorting, and logical parameters of each round of sorting are shown in FIG. 5. Logical parameters of the first round of sorting include: an ascending comparison of the index identifier 0000 and the index identifier 0100, an ascending comparison of the index identifier 0001 and the index identifier 0101, an ascending comparison of the index identifier 0010 and the index identifier 0110, and an ascending comparison of the index identifier 0011 and the index identifier 0111; and an obtained output result of the first round of sorting is that the index identifier 0000 is updated to the to-be-sorted data 5, the index identifier 0100 is updated to the to-be-sorted data 14, the index identifier 0001 is updated to the to-be-sorted data 9, the index identifier 0101 is updated to the to-be-sorted data 12, the index identifier 0010 is updated to the to-be-sorted data 8, the index identifier 0110 is updated to the to-be-sorted data 10, the index identifier 0011 is updated to the to-be-sorted data 3, and the index identifier 0111 is updated to the to-be-sorted data 20. In this case, the service server caches the output result (that is, 5, 9, 8, 3, 14, 12, 10, 20) of the first round of sorting into the data acquisition subcomponent of the data bitonic sorting component $S_1$ instead of storing the output result into the storage component 401d. Therefore, when the second round of sorting is initiated, the data bitonic sorting component $S_1$ may directly acquire the output result of the previous round of sorting from the local data acquisition subcomponent instead of acquiring the output result from the storage component 401d.

Referring to FIG. 5 again, logical parameters of the second round of sorting include: an ascending comparison of the index identifier 0000 and the index identifier 0010, an ascending comparison of the index identifier 0001 and the index identifier 0011, an ascending comparison of the index identifier 0100 and the index identifier 0110, and an ascending comparison of the index identifier 0101 and the index identifier 0111; and an obtained output result of the second round of sorting is that the index identifier 0000 is updated to the to-be-sorted data 5, the index identifier 0010 is updated to the to-be-sorted data 8, the index identifier 0001 is updated to the to-be-sorted data 3, the index identifier 0011 is updated to the to-be-sorted data 9, the index identifier 0100 is updated to the to-be-sorted data 10, the index identifier 0110 is updated to the to-be-sorted data 14, the index identifier 0101 is updated to the to-be-sorted data 12, and the index identifier 0111 is updated to the to-be-sorted data 20. In this case, the service server caches the output result (that is, 5, 3, 8, 9, 10, 12, 14, 20) of the second round of sorting into the data acquisition subcomponent of the data bitonic sorting component $S_1$ instead of storing the output result into the storage component 401d. Therefore, when the third round of sorting is initiated, the data bitonic sorting component $S_1$ may directly acquire the output result of the previous round of sorting from the local data acquisition subcomponent instead of acquiring the output result from the storage component 401d.

Referring to FIG. 5 again, logical parameters of the third round of sorting include: an ascending comparison of the index identifier 0000 and the index identifier 0001, an ascending comparison of the index identifier 0010 and the index identifier 0011, an ascending comparison of the index identifier 0100 and the index identifier 0101, and an ascending comparison of the index identifier 0110 and the index identifier 0111; and an obtained output result of the third round of sorting is that the index identifier 0000 is updated to the to-be-sorted data 3, the index identifier 0001 is updated to the to-be-sorted data 5, the index identifier 0010 is updated to the to-be-sorted data 8, the index identifier 0011 is updated to the to-be-sorted data 9, the index identifier 0100 is updated to the to-be-sorted data 10, the index identifier 0101 is updated to the to-be-sorted data 12, the index identifier 0110 is updated to the to-be-sorted data 14, and the index identifier 0111 is updated to the to-be-sorted data 20. In this case, the service server determines the output result (that is, 3, 5, 8, 9, 10, 12, 14, 20) of the third round of sorting as a target combined data sorting subresult 401g, and stores the target combined data sorting subresult 401g into the storage component 401d.

It will be appreciated that a process of executing the data combination task 402e by the data bitonic sorting component $S_3$ is consistent with the foregoing process, and a difference is that the data bitonic sorting component $S_1$ executes ascending sort, and the data bitonic sorting component $S_3$ executes descending sort, so the process is not described in detail here. A target combined data sorting subresult 402g may be obtained.

After combination is performed once, two target combined data sorting subresults are obtained. The task control component 40a distributes a data combination task again to the data bitonic sorting component according to the two target combined data sorting subresults until the combination of all data sorting subresults is completed, and a group of data sorting results are obtained.

Each of the C data bitonic sorting components includes an index generation subcomponent, which is configured to assign an index value to each piece of to-be-sorted data in the to-be-sorted data sequence. The data sorting request carries a write address. The index value corresponding to each piece of to-be-sorted data in the data sorting result is acquired in sequence, and an index value sequence with a sequence length the same as that of the to-be-sorted data sequence is generated according to acquired index values. The sequence length has a mapping relationship with a quantity of to-be-sorted data in the to-be-sorted data sequence, and indicates the quantity of to-be-sorted data in the to-be-sorted data sequence. A data write request for the index value sequence is transmitted to the data read/write component, and the index value sequence is stored into the write address through the data read/write component.

A return form of the data sorting result may be that to-be-sorted data in an original sequence is resorted from small to large or from large to small and then returned. In some embodiments, the original sequence data is kept unchanged, the index value of each piece of to-be-sorted data in the sorted sequence (that is, the data sorting result) in the to-be-sorted data sequence is returned to constitute the index value sequence with a length the same as that of the to-be-sorted data sequence.

Through the architectural parallelism and process optimization, the embodiments of the present disclosure propose a computing architecture of hardware-accelerated sorting, which implements multiple sorting operations per clock cycle (clock), and improves computing efficiency compared with a central processing unit. The architectural parallelism refers to increasing the parallelism of sort units (that is, the data bitonic sorting components) to use multiple sort units, and in this case, a local memory of a sort accelerator may provide multiple read/write ports for simultaneous access. The process optimization refers to modifying an execution order of algorithms, combining separate computing processes, and combining with a computing pipeline to reduce memory read-comparison-memory write rounds and finally to realize acceleration. Through the process optimization and architectural parallelism, a sorting speed may be increased, and the sorting time T may be reduced from formula (1)

$$T = N * \sum_{x=1}^{\log_2^N} x \quad (1)$$

to formula (2).

$$T \approx N * \sum_{x=1}^{\log_2^N} \text{ceil}(x/(C * p_S)) \quad (2)$$

In formula (1) and formula (2), T is the execution time, n is a to-be-sorted quantity, N=ceil(log 2(n)), C and $P_S$ is an accelerate rate realized by the architectural parallelism and process optimization, and ceil( ) is an upward rounding function. The embodiments of the present disclosure provide a method for simultaneously accelerating C and $P_S$ and an execution architecture thereof, and $P_S$>=2, and C>=2. When $P_S$=2 and C=2, the performance may be improved by nearly 4 times. In one embodiment, a quantity of commonly used sort units may be 2, 4, 8, or the like.

In the embodiments of the present disclosure, a computer device may generate multiple data bitonic sorting tasks for a to-be-sorted data sequence based on C data bitonic sorting components, and simultaneously execute the multiple data bitonic sorting tasks by operating the C data bitonic sorting components in parallel. By simultaneously executing the multiple data bitonic sorting tasks, the sorting time of the to-be-sorted data sequence may be reduced, that is, the task execution time of the to-be-sorted data sequence may be reduced. Moreover, the computer device may combine B data sorting subresults based on the C data bitonic sorting components to obtain a data sorting result for the to-be-sorted data sequence. It can be seen from the above that according to the embodiments of the present disclosure, by operating the C data bitonic sorting components in parallel, the execution time of the sorting tasks for the to-be-sorted data sequence may be reduced, and the sorting efficiency of the sorting tasks may also be improved.

Referring to FIG. 6, FIG. 6 is a schematic flowchart of another data processing method according to an embodiment of the present disclosure. The method may be performed by a service server (such as the foregoing service server 100 shown in FIG. 1) or a terminal device (such as the foregoing terminal device 200a shown in FIG. 1), or may also be alternately performed by the service server and the terminal device. For ease of understanding, in the embodiments of the present disclosure, a description is made by taking a case where the method is performed by a service server as an example. As shown in FIG. 6, the data processing method includes the following steps S201 to S203, which are another embodiment of step S103 in the embodiment corresponding to FIG. 2.

Step S201: Acquire, in a data bitonic sorting component $F_e$, a to-be-sorted data subsequence $A_e$ corresponding to a data bitonic sorting task $D_e$.

Here, a data sorting request carries read addresses respectively corresponding to to-be-sorted data in the to-be-sorted data sequence, and a sort order for the to-be-sorted data sequence. In the data bitonic sorting component $F_e$, a target read address and a second total quantity that are carried in the data bitonic sorting task $D_e$ are acquired. The read addresses respectively corresponding to the to-be-sorted data in the to-be-sorted data sequence include the target read address. The second total quantity indicates a total quantity of to-be-sorted data in the to-be-sorted data subsequence $A_e$. A data acquisition request carrying the target read address is transmitted to a data read/write component, and an initial to-be-sorted data subsequence is acquired from the target read address through the data read/write component. The initial to-be-sorted subsequence belongs to the to-be-sorted data sequence. A quantity difference between the second total quantity and a third total quantity is determined. The third total quantity indicates a total quantity of to-be-sorted data in the initial to-be-sorted data subsequence. To-be-sorted supplementary data is acquired according to the quantity difference and the sort order, and the to-be-sorted supplementary data is added to the initial to-be-sorted data subsequence to obtain the to-be-sorted data subsequence $A_e$. The to-be-sorted data subsequence $A_e$ is loaded into a storage component corresponding to the data bitonic sorting component $F_e$.

Figure 7:
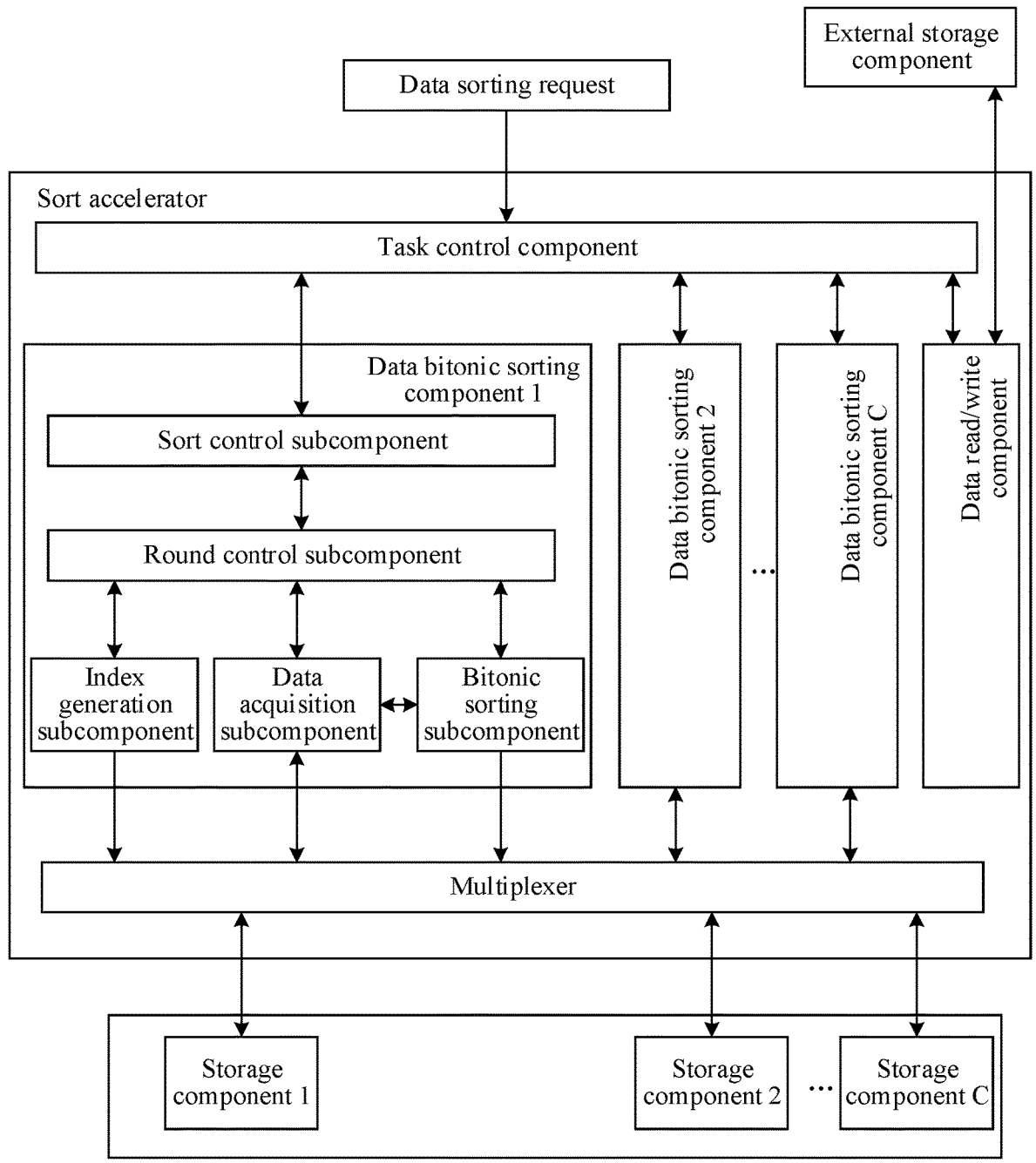
FIG. 7 is a schematic structural diagram of a sort accelerator according to an embodiment of the present disclosure.

Referring to FIG. 7 together, FIG. 7 is a schematic structural diagram of a sort accelerator according to an embodiment of the present disclosure. As shown in FIG. 7, the sort accelerator includes a task control component, C data bitonic sorting components, storage components respectively corresponding to the C data bitonic sorting components, a multiplexer, and a data read/write component.

Here, the data read/write component is configured to acquire a data handling request and handle data according to the data handling request. The data handling request may be a data acquisition request, and the data read/write component acquires an initial to-be-sorted data subsequence according to a target read address in the data acquisition request. The data handling request may be a data write request, and the data read/write component stores an index value sequence into a write address according to the data write request.

The multiplexer is configured to allocate read/write channels of a local memory to the data read/write component or multiple data bitonic sorting components as needed. Each storage component is configured to write data and read data. Written data may include a to-be-sorted data subsequence that is written through the data read/write component from an external storage component, a written intermediate sorting subresult and data sorting subresult that are returned by the data bitonic sorting component, and the like. Read data may include a to-be-sorted data subsequence, an intermediate sorting subresult, a data sorting subresult, and the like. Each data bitonic sorting component is configured to perform bitonic sorting on a to-be-sorted data subsequence to obtain a data sorting subresult, and is further configured to combine data sorting subresults to obtain a data sorting result for the to-be-sorted data sequence. The data bitonic sorting components may be also referred to as sort units. The task control component is configured to acquire a data sorting request, initiate B data bitonic sorting tasks according to the data sorting request, and transmit one data bitonic sorting task to one data bitonic sorting component, is further configured to acquire a sorting completion signal returned by each data bitonic sorting component, initiate multiple data combination tasks based on the B sorting completion signals, and distribute one data combination task to the data bitonic sorting component associated with a data sorting subresult, and is further configured to acquire a combination completion signal, and transmit the combination completion signal to a top-level control component. The combination completion signal indicates the completion of sorting of the to-be-sorted data in the to-be-sorted data sequence. The task control component may be also referred to as a control unit.

The data read/write component may be direct memory access (DMA), and the DMA may load the to-be-sorted data from an external memory (that is, the external storage component) of the sort accelerator into an internal memory (that is, the storage component) of the sort accelerator, and store specified data in the internal memory of the sort accelerator into the external memory (that is, the external storage component) of the sort accelerator. The DMA may implement the foregoing process in an instruction queue mode or in a polling mode, which is not defied herein.

The multiplexer (MUX) is an internal use selector of the sort accelerator, a service server allocates read/write channels of a memory to the DMA or multiple sort units as needed, and the local memory supports C read channels and C write channels, and may be constituted by splicing multiple physical storage units together to realize writing-while-reading of the multiple channels, which is not defined herein.

The storage components corresponding to the data bitonic sorting components refer to the local memories of the sort accelerator, and the to-be-sorted data in the to-be-sorted data sequence is stored in the local memories or the external memory of the sort accelerator. If the to-be-sorted data is stored in the external memory, the service server reads the to-be-sorted data from the external memory to the local memory through the data read/write component and performs bitonic sorting on the to-be-sorted data.

It will be appreciated that if the sort order is from small to large, the to-be-sorted supplementary data is preferentially selected as positive infinity, and added to a high address side of the to-be-sorted data in the initial to-be-sorted data subsequence, that is, positive infinity is sorted after the to-be-sorted data. If the sort order is from large to small, the to-be-sorted supplementary data is preferentially selected as negative infinity, and added to the high address side of the to-be-sorted data in the initial to-be-sorted data subsequence, that is, negative infinity is sorted after the to-be-sorted data.

Step S202: Perform bitonic sorting on the to-be-sorted data subsequence $A_e$ to obtain a data sorting subresult corresponding to the to-be-sorted data subsequence $A_e$.

Here, the data bitonic sorting component $F_e$ includes a sort control subcomponent, a round control subcomponent, a data acquisition subcomponent, and a bitonic sorting subcomponent. The sort control subcomponent initiates the round control subcomponent when acquiring a data loading completion notification. The data loading completion notification indicates that the storage component corresponding to the data bitonic sorting component $F_e$ has loaded the to-be-sorted data subsequence $A_e$. In the round control subcomponent, a bitonic sorting phase corresponding to the to-be-sorted data subsequence $A_e$ and bitonic sorting logical parameters corresponding to the bitonic sorting phase are determined according to a second total quantity, and the bitonic sorting phase and the bitonic sorting logical parameters corresponding to the bitonic sorting phase are transmitted to the data acquisition subcomponent. The second total quantity indicates a total quantity of to-be-sorted data in the to-be-sorted data subsequence $A_e$. In the data acquisition subcomponent, intermediate to-be-sorted data is acquired according to the bitonic sorting phase and the bitonic sorting logical parameters corresponding to the bitonic sorting phase, transmitted to the bitonic sorting subcomponent, and sorted through the bitonic sorting subcomponent to obtain an intermediate sorting subresult, and a data sorting subresult corresponding to the to-be-sorted data subsequence $A_e$ is determined according to the intermediate sorting subresult. The to-be-sorted data subsequence $A_e$ includes the intermediate to-be-sorted data.

In the embodiments of the present disclosure, a processing of determining the data sorting subresult corresponding to the to-be-sorted data subsequence $A_e$ may include the following steps. There are at least two bitonic sorting phases. In the data acquisition subcomponent, a first data sorting transition subresult is read from the storage component according to an $i^{th}$ bitonic sorting phase in the at least two bitonic sorting phases, i is a positive integer greater than 1, and the first data sorting transition subresult is an output result of a $(i-1)^{th}$ bitonic sorting phase. Bitonic sorting logical parameters corresponding to the $i^{th}$ bitonic sorting phase include logical parameters of n rounds of sorting, and n is determined based on i and is a positive integer greater than 1. The intermediate to-be-sorted data is acquired from an intermediate data sorting transition subresult according to logical parameters of a $j^{th}$ round of sorting, and j is a positive integer less than or equal to n. If j is 1, the intermediate data sorting transition subresult is the first data sorting transition subresult. If j is not 1, the intermediate data sorting transition subresult is a second data sorting transition subresult cached in the data acquisition subcomponent, and the second data sorting transition subresult is determined based on logical parameters of a $(j-1)^{th}$ round of sorting. The intermediate to-be-sorted data is transmitted to the bitonic sorting subcomponent, and sorted through the bitonic sorting subcomponent to obtain the intermediate sorting subresult of the intermediate to-be-sorted data, and a third data sorting transition subresult corresponding to the to-be-sorted data subsequence $A_e$ is determined according to the intermediate sorting subresult. If j is less than n, the third data sorting transition subresult is cached into the data acquisition subcomponent. If j=n, and the $i^{th}$ bitonic sorting phase is the last bitonic sorting phase in the at least two bitonic sorting phases, the third data sorting transition subresult is stored into the storage component, and determined as the data sorting subresult corresponding to the to-be-sorted data subsequence $A_e$.

Referring to FIG. 7 again, the multiple data bitonic sorting components, the task control component, and the data read/write component may constitute a sort accelerator. It will be appreciated that basic structures of the data bitonic sorting components are the same. In FIG. 7, the basic structure of each data bitonic sorting component is shown as a data bitonic sorting component 1, which may include a sort control subcomponent, a round control subcomponent, an index generation subcomponent, a data acquisition subcomponent, and a bitonic sorting subcomponent. In a bitonic sorting scene, implementations of functions of these subcomponents may refer to step S202.

In the embodiments of the present disclosure, the sort control subcomponent is configured to acquire a data bitonic sorting task allocated by the task control component, and initiate the round control subcomponent based on the data bitonic sorting task, and is further configured to acquire a combination completion signal (including a sorting completion signal and a combination completion signal) transmitted by the round control subcomponent, and transmit the combination completion signal to the task control component. It can be seen from the above that the sort control subcomponent realizes the signal interaction between the data bitonic sorting component and the task control component, and initiates the round control subcomponent after receiving an enable signal. The sort control subcomponent may be referred to as a sort control module.

The round control subcomponent is configured to determine a bitonic sorting phase and bitonic sorting logical parameters corresponding to the bitonic sorting phase according to a to-be-sorted data subsequence, and transmit corresponding enable signals to the index generation subcomponent, the data acquisition subcomponent, and the bitonic sorting subcomponent. The round control subcomponent may be referred to as a round control module. The index generation subcomponent is configured to first read to-be-sorted data, generate a unique index identifier for each group of data, and store the index identifier into a data buffer. The index generation subcomponent may be referred to as an index generation module. The data acquisition subcomponent is configured to perform a round of traversal on to-be-sorted data in the to-be-sorted data subsequence. The data acquisition subcomponent may be referred to as a single-round data control and access-memory address computation module. The bitonic sorting subcomponent is used as a computation subcomponent during bitonic sorting to realize quick comparison of data. The bitonic sorting subcomponent may be referred to as a comparison module.

According to the embodiments of the present disclosure, the process optimization may be adopted to combine two or more rounds of operation for the same data, thereby replacing multiple read/write processes with local one-time read and one-time write of multiple pieces of data, reducing the total read/write rounds of data, and achieving an acceleration effect. An implementation refers to the description of step S103 in the foregoing embodiment corresponding to FIG. 3.

Step S203: Operate B-1 data bitonic sorting tasks in parallel through C-1 data bitonic sorting components during operation of the data bitonic sorting component $F_e$ to obtain data sorting subresults respectively outputted by the C-1 data bitonic sorting components, the C-1 data bitonic sorting components referring to data bitonic sorting components in the C data bitonic sorting components except the data bitonic sorting component $F_e$, and the B-1 data bitonic sorting tasks referring to data bitonic sorting tasks in the B data bitonic sorting tasks except the data bitonic sorting task $D_e$.

According to the embodiments of the present disclosure, through the architectural parallelism and process optimization, the execution time of bitonic sorting may be reduced. Referring to the embodiment corresponding to FIG. 3, it can be seen that a top-level control unit transmits a sort instruction, and after receiving the instruction, a sort accelerator reads to-be-sorted data from an external memory to a local memory, invokes multiple data bitonic sorting components to complete the sorting, stores a data sorting result from the local memory into the external memory, and transmits an instruction completion response to the top-level control unit.

In the embodiments of the present disclosure, a computer device may generate multiple data bitonic sorting tasks for a to-be-sorted data sequence based on C data bitonic sorting components, and simultaneously execute the multiple data bitonic sorting tasks by operating the C data bitonic sorting components in parallel. By simultaneously executing the multiple data bitonic sorting tasks, the sorting time, that is, the task execution time, of the to-be-sorted data sequence may be reduced. Subsequently, the computer device may combine B data sorting subresults based on the C data bitonic sorting components to obtain a data sorting result for the to-be-sorted data sequence. It can be seen from the above that according to the embodiments of the present disclosure, by operating the C data bitonic sorting components in parallel, the execution time of the sorting tasks for the to-be-sorted data sequence may be reduced, and the sorting efficiency of the sorting tasks may also be improved.

Figure 8:
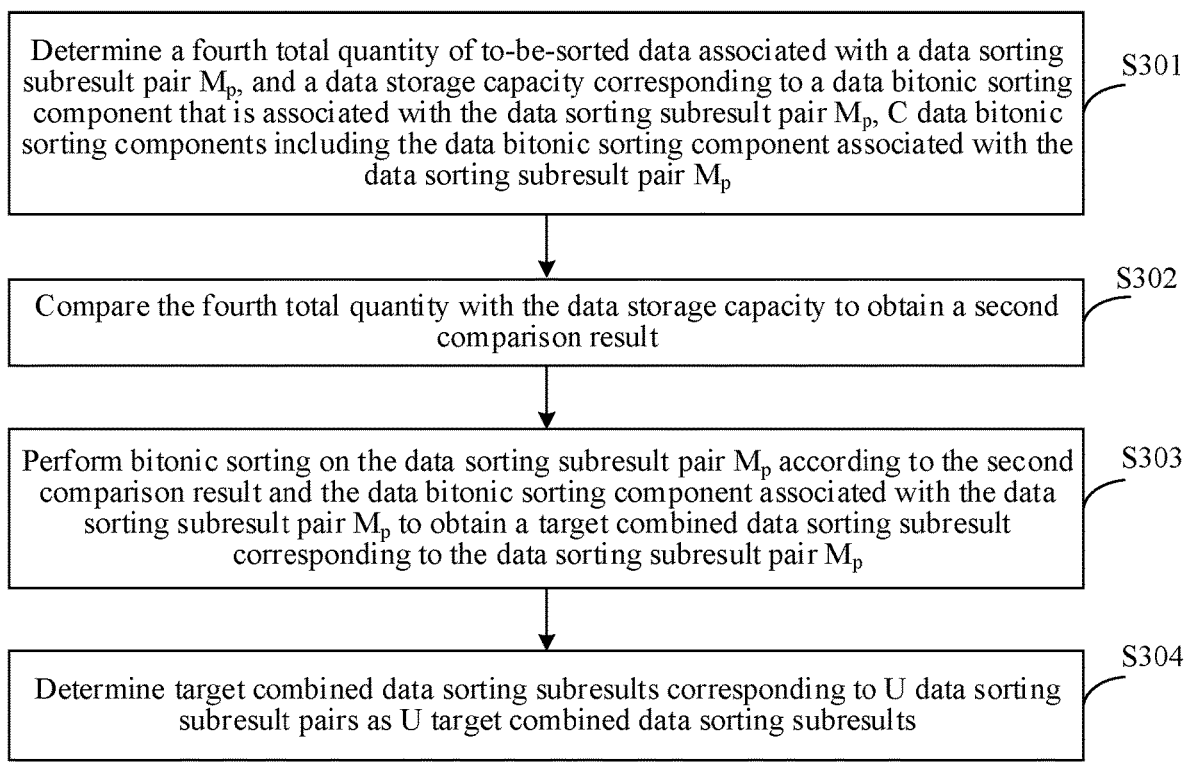
FIG. 8 is a schematic flowchart of still another data processing method according to an embodiment of the present disclosure.

Referring to FIG. 8, FIG. 8 is a schematic flowchart of still another data processing method according to an embodiment of the present disclosure. The method may be performed by a service server (such as the foregoing service server 100 shown in FIG. 1) or a terminal device (such as the foregoing terminal device 200a shown in FIG. 1), or may also be alternately performed by the service server and the terminal device. For ease of understanding, in the embodiments of the present disclosure, a description is made by taking a case where the method is performed by a service server as an example. As shown in FIG. 8, the data processing method includes the following steps S301 to S304, which are another embodiment of step S104 in the embodiment corresponding to FIG. 2.

Step S301: Determine a fourth total quantity of to-be-sorted data associated with a data sorting subresult pair $M_p$ and a data storage capacity corresponding to a data bitonic sorting component that is associated with the data sorting subresult pair $M_p$, the C data bitonic sorting components including the data bitonic sorting component associated with the data sorting subresult pair $M_p$.

Step S302: Compare the fourth total quantity with the data storage capacity to obtain a second comparison result.

An implementation process of steps $S_{301}$ and $S_{302}$ refers to the description of step S104 in the foregoing embodiment corresponding to FIG. 2, which is not described in detail here.

Step S303: Perform bitonic sorting on the data sorting subresult pair $M_p$ according to the second comparison result and the data bitonic sorting component associated with the data sorting subresult pair $M_p$ to obtain a target combined data sorting subresult corresponding to the data sorting subresult pair $M_p$.

Here, the data sorting subresult pair $M_p$ includes a first data sorting subresult and a second data sorting subresult. If the second comparison result is that the fourth total quantity is greater than the data storage capacity, the first data sorting subresult is equally divided into a first ordered data segment and a second ordered data segment, and the second data sorting subresult is equally divided into a third ordered data segment and a fourth ordered data segment. If data in the first ordered data segment is less than or equal to data in the second ordered data segment, and data in the third ordered data segment is less than or equal to data in the fourth ordered data segment, bitonic sorting is performed on the first ordered data segment and the third ordered data segment based on a first data bitonic sorting component to obtain a third data sorting subresult. The data bitonic sorting component associated with the data sorting subresult pair $M_p$ includes the first data bitonic sorting component. Bitonic sorting is performed on the second ordered data segment and the fourth ordered data segment based on a second data bitonic sorting component to obtain a fourth data sorting subresult. The data bitonic sorting component associated with the data sorting subresult pair $M_p$ includes the second data bitonic sorting component. The third data sorting subresult is equally divided into a fifth ordered data segment and a sixth ordered data segment, and the fourth data sorting subresult is equally divided into a seventh ordered data segment and an eighth ordered data segment. If data in the fifth ordered data segment is less than or equal to data in the sixth ordered data segment, and data in the seventh ordered data segment is less than or equal to data in the eighth ordered data segment, bitonic sorting is performed on the sixth ordered data segment and the seventh ordered data segment based on a target data bitonic sorting component to obtain a fifth data sorting subresult. The target data bitonic sorting component is the first data bitonic sorting component or the second data bitonic sorting component. The target combined data sorting subresult corresponding to the data sorting subresult pair $M_p$ is obtained based on the fifth ordered data segment, the fifth data sorting subresult, and the eighth ordered data segment.

Figure 9:
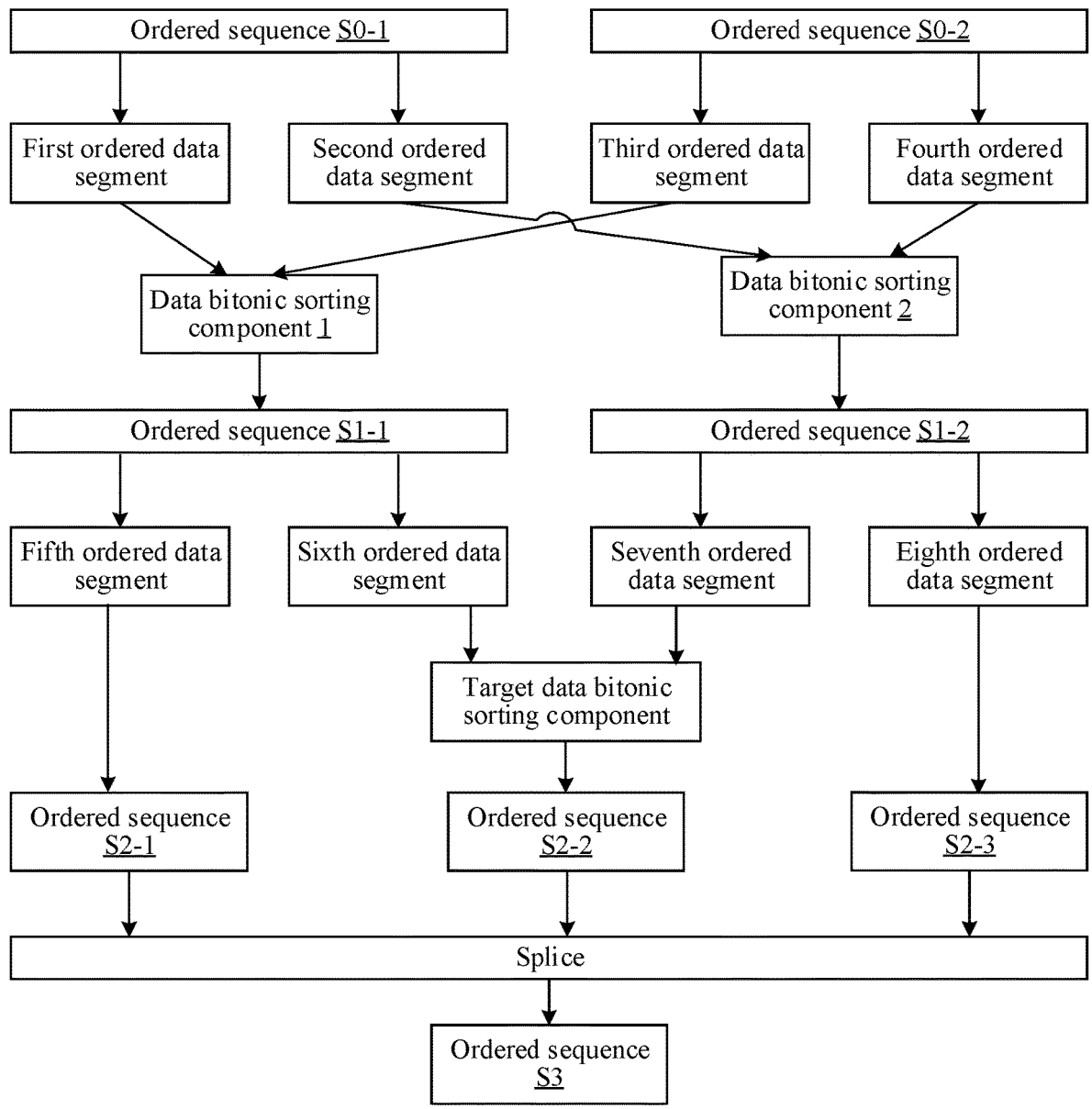
FIG. 9 is a schematic diagram of a scene of yet another data processing according to an embodiment of the present disclosure.

Referring to FIG. 9 together, FIG. 9 is a schematic diagram of a scene of yet another data processing according to an embodiment of the present disclosure. As shown in FIG. 9, a service server equally divides two ordered sequences respectively into two parts to obtain 4 ordered sequences, that is, equally divides an ordered sequence S0-1 (equivalent to the first data sorting subresult) into a first ordered data segment and a second ordered data segment, and equally divides an ordered sequence S0-2 (equivalent to the second data sorting subresult) into a third ordered data segment and a fourth ordered data segment. The service server performs bitonic sorting on the first ordered data segment and the third ordered data segment based on a first data bitonic sorting component to obtain a third data sorting subresult (equivalent to an ordered sequence S1-1 in FIG. 9). The service server performs bitonic sorting on the second ordered data segment and the fourth ordered data segment based on a second data bitonic sorting component to obtain a fourth data sorting subresult (equivalent to an ordered sequence S1-2 in FIG. 9). The service server equally divides the third data sorting subresult into a fifth ordered data segment and a sixth ordered data segment, equally divides the fourth data sorting subresult into a seventh ordered data segment and an eighth ordered data segment, performs bitonic sorting on the sixth ordered data segment and the seventh ordered data segment based on a target data bitonic sorting component to obtain a fifth data sorting subresult (equivalent to an ordered sequence S2-2 in FIG. 9), takes the fifth ordered data segment as an ordered sequence S2-1, takes the eighth ordered data segment as an ordered sequence S2-3, and splices the ordered sequence S2-1, the ordered sequence S2-2, and the ordered sequence S2-3 together from small to large through a concatenating operation to obtain a final output.

Step S304: Determine target combined data sorting subresults corresponding to U data sorting subresult pairs as U target combined data sorting subresults.

An implementation process of step S304 refers to the description of step S104 in the foregoing embodiment corresponding to FIG. 2.

In the embodiments of the present disclosure, a computer device may generate multiple data bitonic sorting tasks for a to-be-sorted data sequence based on C data bitonic sorting components, and simultaneously execute the multiple data bitonic sorting tasks by operating the C data bitonic sorting components in parallel. By simultaneously executing the multiple data bitonic sorting tasks, the sorting time, that is, the task execution time, of the to-be-sorted data sequence may be reduced. Subsequently, the computer device may combine B data sorting subresults based on the C data bitonic sorting components to obtain a data sorting result for the to-be-sorted data sequence. It can be seen from the above that according to the embodiments of the present disclosure, by operating the C data bitonic sorting components in parallel, the execution time of the sorting tasks for the to-be-sorted data sequence may be reduced, and the sorting efficiency of the sorting tasks may also be improved.

Figure 10:
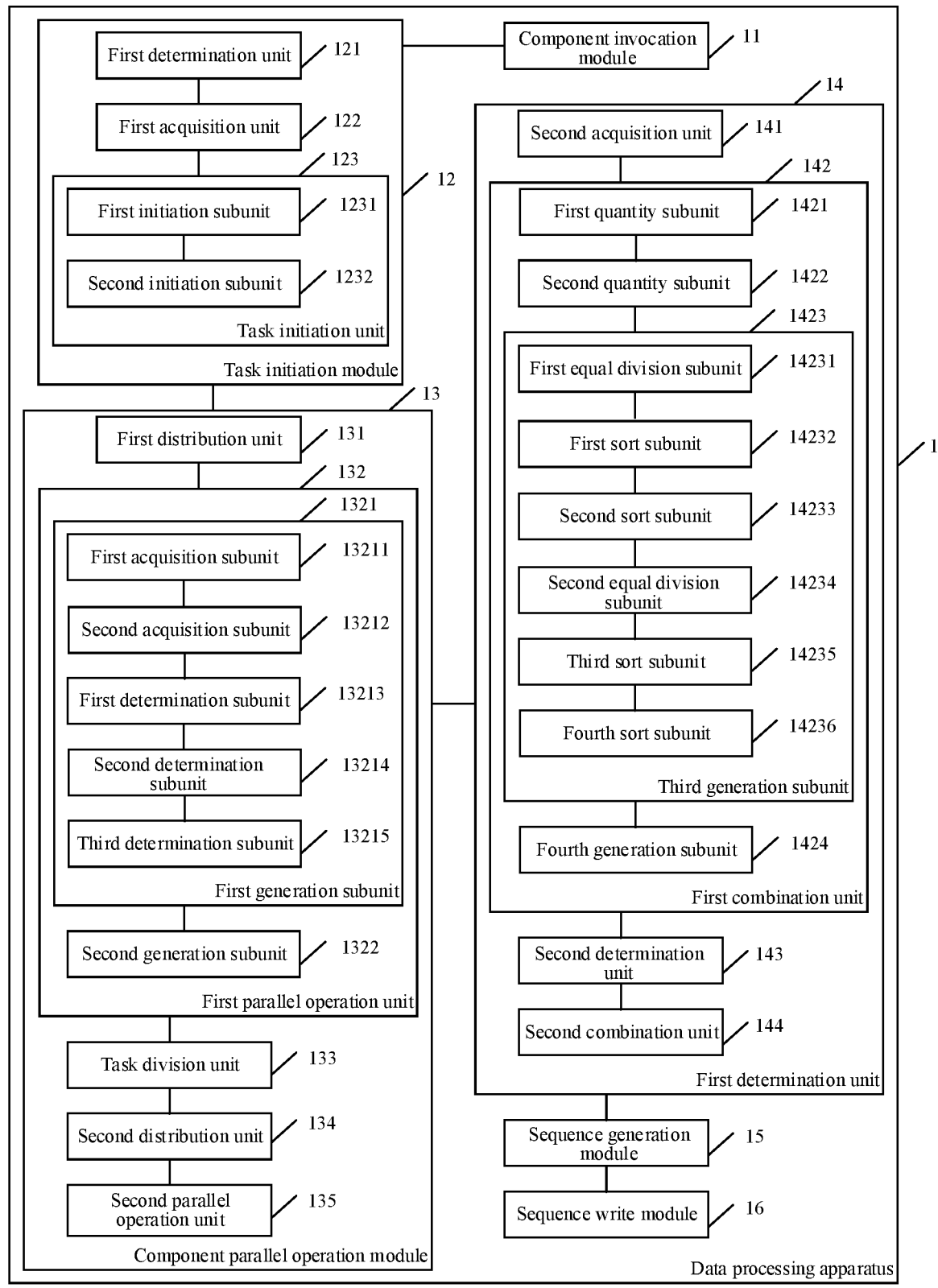
FIG. 10 is a schematic structural diagram of a data processing apparatus according to an embodiment of the present disclosure.

Referring to FIG. 10, FIG. 10 is a schematic structural diagram of a data processing apparatus according to an embodiment of the present disclosure. The data processing apparatus may be a computer program (including program codes) running in a computer device. For example, the data processing apparatus is application software. The apparatus may be configured to perform corresponding steps in the method according to the embodiments of the present disclosure. As shown in FIG. 10, a data processing apparatus 1 may include: a component invocation module 11, a task initiation module 12, a component parallel operation module 13, and a result combination module 14.

The component invocation module 11 is configured to acquire a data sorting request for a to-be-sorted data sequence, and invoke C data bitonic sorting components according to the data sorting request, C being a positive integer greater than 1. The task initiation module 12 is configured to initiate B data bitonic sorting tasks according to the to-be-sorted data sequence and the C data bitonic sorting components, B being a positive integer greater than 1, and the B data bitonic sorting tasks being respectively associated with different to-be-sorted data subsequences, and all the B to-be-sorted data subsequences being generated based on the to-be-sorted data sequence. The component parallel operation module 13 is configured to operate the C data bitonic sorting components in parallel according to the B data bitonic sorting tasks to obtain B data sorting subresults outputted by the C data bitonic sorting components, one data sorting subresult indicating a sorting result of the to-be-sorted data subsequence associated with one data bitonic sorting task. The result combination module 14 is configured to combine the B data sorting subresults based on the C data bitonic sorting components to obtain a data sorting result for the to-be-sorted data sequence.

In some embodiments, the component invocation module 11 is further configured to acquire the data sorting request, and transmit the data sorting request to a task control component, the data sorting request carrying a first total quantity of to-be-sorted data in the to-be-sorted data sequence. The task initiation module 12 may include: a first determination unit 121, a first acquisition unit 122, and a task initiation unit 123. The first determination unit 121 is configured to determine, in the task control component, a to-be-sorted quantity associated with the first total quantity, the to-be-sorted quantity is equal to or greater than the first total quantity. The first acquisition unit 122 is configured to acquire a data storage capacity corresponding to each of the C data bitonic sorting components, and compare the to-be-sorted quantity with a total data storage capacity to obtain a first comparison result, the total data storage capacity being equal to the sum of the C data storage capacities. The task initiation unit 123 is configured to initiate the B data bitonic sorting tasks according to the first comparison result.

In some embodiments, the task initiation unit 123 may include: a first initiation subunit 1231 and a second initiation subunit 1232. The first initiation subunit 1231 is configured to acquire a first quantity ratio of the to-be-sorted quantity to the total data storage capacity in response to that the first comparison result is that the to-be-sorted quantity is greater than the total data storage capacity. The first initiation subunit 1231 is further configured to initiate the B data bitonic sorting tasks according to the first quantity ratio. A product of C and the first quantity ratio is equal to B. A second total quantity carried in one data bitonic sorting task is equal to the data storage capacity. The second total quantity indicates the following information: a total quantity of to-be-sorted data in the to-be-sorted data subsequence associated with one data bitonic sorting task. The second initiation subunit 1232 is configured to initiate the B data bitonic sorting tasks according to the C data bitonic sorting components in response to that the first comparison result is that the to-be-sorted quantity is less than or equal to the total data storage capacity. B is equal to C.

In some embodiments, the component parallel operation module 13 may include: a first distribution unit 131 and a first parallel operation unit 132. The first distribution unit 131 is configured to distribute the B data bitonic sorting tasks to the C data bitonic sorting components in response to that B is equal to C. One data bitonic sorting task is distributed to one data bitonic sorting component. The first parallel operation unit 132 is configured to operate the B data bitonic sorting tasks in parallel through the C data bitonic sorting components to obtain data sorting subresults respectively outputted by the C data bitonic sorting components.

In some embodiments, the B data bitonic sorting tasks include a data bitonic sorting task $D_e$, and e is a positive integer less than or equal to B. The B to-be-sorted data subsequences include a to-be-sorted data subsequence $A_e$ corresponding to the data bitonic sorting task $D_e$. The C data bitonic sorting components include a data bitonic sorting component $F_e$ configured to execute the data bitonic sorting task $D_e$. The first parallel operation unit 132 may include: a first generation subunit 1321 and a second generation subunit 1322. The first generation subunit 1321 is configured to acquire, in the data bitonic sorting component $F_e$, the to-be-sorted data subsequence $A_e$ corresponding to the data bitonic sorting task $D_e$, and perform bitonic sorting on the to-be-sorted data subsequence $A_e$ to obtain a data sorting subresult corresponding to the to-be-sorted data subsequence $A_e$. The second generation subunit 1322 is configured to operate B-1 data bitonic sorting tasks in parallel through C-1 data bitonic sorting components during operation of the data bitonic sorting component $F_e$ to obtain data sorting subresults respectively outputted by the C-1 data bitonic sorting components. The C-1 data bitonic sorting components refer to data bitonic sorting components in the C data bitonic sorting components except the data bitonic sorting component $F_e$. The B-1 data bitonic sorting tasks refer to data bitonic sorting tasks in the B data bitonic sorting tasks except the data bitonic sorting task $D_e$.

In some embodiments, the data sorting request carries read addresses respectively corresponding to the to-be-sorted data in the to-be-sorted data sequence, and a sort order for the to-be-sorted data sequence. The first generation subunit 1321 may include: a first acquisition subunit 13211, a second acquisition subunit 13212, and a first determination subunit 13213. The first acquisition subunit 13211 is configured to acquire, in the data bitonic sorting component $F_e$, a target read address and a second total quantity that are carried in the data bitonic sorting task $D_e$. The read addresses respectively corresponding to the to-be-sorted data in the to-be-sorted data sequence include the target read address. The second total quantity indicates a total quantity of to-be-sorted data in the to-be-sorted data subsequence $A_e$. The second acquisition subunit 13212 is configured to transmit a data acquisition request carrying the target read address to a data read/write component, and acquire an initial to-be-sorted data subsequence from the target read address through the data read/write component. The initial to-be-sorted subsequence belongs to the to-be-sorted data sequence. The first determination subunit 13213 is configured to determine a quantity difference between the second total quantity and a third total quantity. The third total quantity indicates a total quantity of to-be-sorted data in the initial to-be-sorted data subsequence. The first determination subunit 13213 is further configured to acquire to-be-sorted supplementary data according to the quantity difference and the sort order, and add the to-be-sorted supplementary data to the initial to-be-sorted data subsequence to obtain the to-be-sorted data subsequence $A_e$. The first determination subunit 13213 is further configured to load the to-be-sorted data subsequence $A_e$ into a storage component corresponding to the data bitonic sorting component $F_e$.

In some embodiments, the data bitonic sorting component $F_e$ includes a sort control subcomponent, a round control subcomponent, a data acquisition subcomponent, and a bitonic sorting subcomponent. The first generation subunit 1321 may include: a second determination subunit 13214 and a third determination subunit 13215. The second determination subunit 13214 is configured to initiate the round control subcomponent when the sort control subcomponent acquires a data loading completion notification. The data loading completion notification indicates that the storage component corresponding to the data bitonic sorting component $F_e$ has loaded the to-be-sorted data subsequence $A_e$. The second determination subunit 13214 is further configured to determine, in the round control subcomponent, a bitonic sorting phase corresponding to the to-be-sorted data subsequence $A_e$ and bitonic sorting logical parameters corresponding to the bitonic sorting phase according to a second total quantity, and transmit the bitonic sorting phase and the bitonic sorting logical parameters corresponding to the bitonic sorting phase to the data acquisition subcomponent. The second total quantity indicates a total quantity of to-be-sorted data in the to-be-sorted data subsequence $A_e$. The third determination subunit 13215 is configured to acquire, in the data acquisition subcomponent, intermediate to-be-sorted data according to the bitonic sorting phase and the bitonic sorting logical parameters corresponding to the bitonic sorting phase, transmit the intermediate to-be-sorted data to the bitonic sorting subcomponent, and sort the intermediate to-be-sorted data through the bitonic sorting subcomponent to obtain an intermediate sorting subresult, and determine the data sorting subresult corresponding to the to-be-sorted data subsequence $A_e$ according to the intermediate sorting subresult. The to-be-sorted data subsequence $A_e$ includes the intermediate to-be-sorted data.

In some embodiments, there are at least two bitonic sorting phases. The third determination subunit 13215 is configured to read, in the data acquisition subcomponent, a first data sorting transition subresult from the storage component according to an $i^{th}$ bitonic sorting phase in the at least two bitonic sorting phases. i is a positive integer greater than 1, and the first data sorting transition subresult is an output result of a $(i-1)^{th}$ bitonic sorting phase. Bitonic sorting logical parameters corresponding to the $i^{th}$ bitonic sorting phase include logical parameters of n rounds of sorting, and n is determined based on i and is a positive integer greater than 1. The third determination subunit 13215 is further configured to acquire the intermediate to-be-sorted data from an intermediate data sorting transition subresult according to logical parameters of a $j^{th}$ round of sorting. j is a positive integer less than or equal to n. If j is 1, the intermediate data sorting transition subresult is the first data sorting transition subresult. If j is not 1, the intermediate data sorting transition subresult is a second data sorting transition subresult cached in the data acquisition subcomponent, and the second data sorting transition subresult is determined based on logical parameters of a $(j-1)^{th}$ round of sorting. The third determination subunit 13215 is further configured to transmit the intermediate to-be-sorted data to the bitonic sorting subcomponent, sort the intermediate to-be-sorted data through the bitonic sorting subcomponent to obtain an intermediate sorting subresult of the intermediate to-be-sorted data, and determine a third data sorting transition subresult corresponding to the to-be-sorted data subsequence $A_e$ according to the intermediate sorting subresult. The third determination subunit 13215 is further configured to cache the third data sorting transition subresult into the data acquisition subcomponent in response to that j is less than n. The third determination subunit 13215 is further configured to store the third data sorting transition subresult into the storage component in response to that j=n, and the $i^{th}$ bitonic sorting phase is the last bitonic sorting phase in the at least two bitonic sorting phases, and determine the third data sorting transition subresult as the data sorting subresult corresponding to the to-be-sorted data subsequence $A_e$.

In some embodiments, the component parallel operation module 13 may include: a task division unit 133, a second distribution unit 134, and a second parallel operation unit 135. The task division unit 133 is configured to divide the B data bitonic sorting tasks into K*C data bitonic sorting tasks in response to that B is greater than C. K is the maximum rounds of operation respectively corresponding to the C data bitonic sorting components. The second distribution unit 134 is configured to distribute C data bitonic sorting tasks in an $i^{th}$ round of operation to the C data bitonic sorting components. One data bitonic sorting task is distributed to one data bitonic sorting component. i is a positive integer less than or equal to K. The second parallel operation unit 135 is configured to operate the C data bitonic sorting tasks in the $i^{th}$ round of operation in parallel through the C data bitonic sorting components to obtain data sorting subresults respectively outputted by the C data bitonic sorting components, and obtain data sorting subresults respectively corresponding to the B data bitonic sorting tasks when i is equal to K.

In some embodiments, the result combination module 14 may include: a second acquisition unit 141, a first combination unit 142, a second determination unit 143, and a second combination unit 144. The second acquisition unit 141 is configured to acquire U data sorting subresult pairs during an $L^{th}$ combination. U is a positive integer, and L is a positive integer. If L is 1, the U data sorting subresult pairs are generated based on the B data sorting subresults. If L is not 1, the U data sorting subresult pairs are generated based on a historical combined data sorting subresult, and the historical combined data sorting subresult is a subresult obtained during a $(L-1)^{th}$ combination. The first combination unit 142 is configured to combine the U data sorting subresult pairs based on the C data bitonic sorting components to obtain U target combined data sorting subresults. The second determination unit 143 is configured to determine the U target combined data sorting subresults as the data sorting result corresponding to the to-be-sorted data sequence in response to that U is equal to 1. The second combination unit 144 is configured to combine the U target combined data sorting subresults based on the C data bitonic sorting components during a $(L+1)^{th}$ combination to obtain the data sorting result for the to-be-sorted data sequence in response to that U is greater than 1.

In some embodiments, the U data sorting subresult pairs include a data sorting subresult pair $M_p$, and p is a positive integer less than or equal to U. The first combination unit 142 may include: a first quantity subunit 1421, a second quantity subunit 1422, a third generation subunit 1423, and a fourth generation subunit 1424. The first quantity subunit 1421 is configured to determine a fourth total quantity of to-be-sorted data associated with the data sorting subresult pair $M_p$, and a data storage capacity corresponding to a data bitonic sorting component that is associated with the data sorting subresult pair $M_p$. The C data bitonic sorting components include the data bitonic sorting component associated with the data sorting subresult pair $M_p$. The second quantity subunit 1422 is configured to compare the fourth total quantity with the data storage capacity to obtain a second comparison result. The third generation subunit 1423 is configured to perform bitonic sorting on the data sorting subresult pair $M_p$ according to the second comparison result and the data bitonic sorting component associated with the data sorting subresult pair $M_p$ to obtain a target combined data sorting subresult corresponding to the data sorting subresult pair $M_p$. The fourth generation subunit 1424 is configured to determine target combined data sorting subresults corresponding to the U data sorting subresult pairs as the U target combined data sorting subresults.

In some embodiments, the data sorting subresult pair $M_p$ includes a first data sorting subresult and a second data sorting subresult. The third generation subunit 1423 may include: a first equal division subunit 14231, a first sort subunit 14232, a second sort subunit 14233, a second equal division subunit 14234, a third sort subunit 14235, and a fourth sort subunit 14236. The first equal division subunit 14231 is configured to equally divide the first data sorting subresult into a first ordered data segment and a second ordered data segment, and equally divide the second data sorting subresult into a third ordered data segment and a fourth ordered data segment in response to that the second comparison result is that the fourth total quantity is greater than the data storage capacity. The first sort subunit 14232 is configured to perform bitonic sorting on the first ordered data segment and the third ordered data segment based on a first data bitonic sorting component to obtain a third data sorting subresult in response to that data in the first ordered data segment is less than or equal to data in the second ordered data segment, and data in the third ordered data segment is less than or equal to data in the fourth ordered data segment. The data bitonic sorting component associated with the data sorting subresult pair $M_p$ includes the first data bitonic sorting component. The second sort subunit 14233 is configured to perform bitonic sorting on the second ordered data segment and the fourth ordered data segment based on a second data bitonic sorting component to obtain a fourth data sorting subresult. The data bitonic sorting component associated with the data sorting subresult pair $M_p$ includes the second data bitonic sorting component. The second equal division subunit 14234 is configured to equally divide the third data sorting subresult into a fifth ordered data segment and a sixth ordered data segment, and equally divide the fourth data sorting subresult into a seventh ordered data segment and an eighth ordered data segment. The third sort subunit 14235 is configured to perform bitonic sorting on the sixth ordered data segment and the seventh ordered data segment based on a target data bitonic sorting component to obtain a fifth data sorting subresult in response to that data in the fifth ordered data segment is less than or equal to data in the sixth ordered data segment, and data in the seventh ordered data segment is less than or equal to data in the eighth ordered data segment. The target data bitonic sorting component is the first data bitonic sorting component or the second data bitonic sorting component. The fourth sort subunit 14236 is configured to determine the target combined data sorting subresult corresponding to the data sorting subresult pair $M_p$ based on the fifth ordered data segment, the fifth data sorting subresult, and the eighth ordered data segment.

In some embodiments, each of the C data bitonic sorting components includes an index generation subcomponent, which is configured to assign an index value to each piece of to-be-sorted data in the to-be-sorted data sequence. The data sorting request carries a write address. The data processing apparatus 1 may further include: a sequence generation module 15 and a sequence write module 16. The sequence generation module 15 is configured to acquire the index value corresponding to each piece of to-be-sorted data in the data sorting result in sequence, and generate an index value sequence with a sequence length the same as that of the to-be-sorted data sequence according to acquired index values. The sequence write module 16 is configured to transmit a data write request for the index value sequence to the data read/write component, and store the index value sequence into the write address through the data read/write component.

In the embodiments of the present disclosure, a computer device may generate multiple data bitonic sorting tasks for a to-be-sorted data sequence based on C data bitonic sorting components, and simultaneously execute the multiple data bitonic sorting tasks by operating the C data bitonic sorting components in parallel. By simultaneously executing the multiple data bitonic sorting tasks, the sorting time of the to-be-sorted data sequence may be reduced, that is, the task execution time of the to-be-sorted data sequence may be reduced. Moreover, the computer device may combine B data sorting subresults based on the C data bitonic sorting components to obtain a data sorting result for the to-be-sorted data sequence. It can be seen from the above that according to the embodiments of the present disclosure, by operating the C data bitonic sorting components in parallel, the execution time of the sorting tasks for the to-be-sorted data sequence may be reduced, and the sorting efficiency of the sorting tasks may also be improved.

Figure 11:
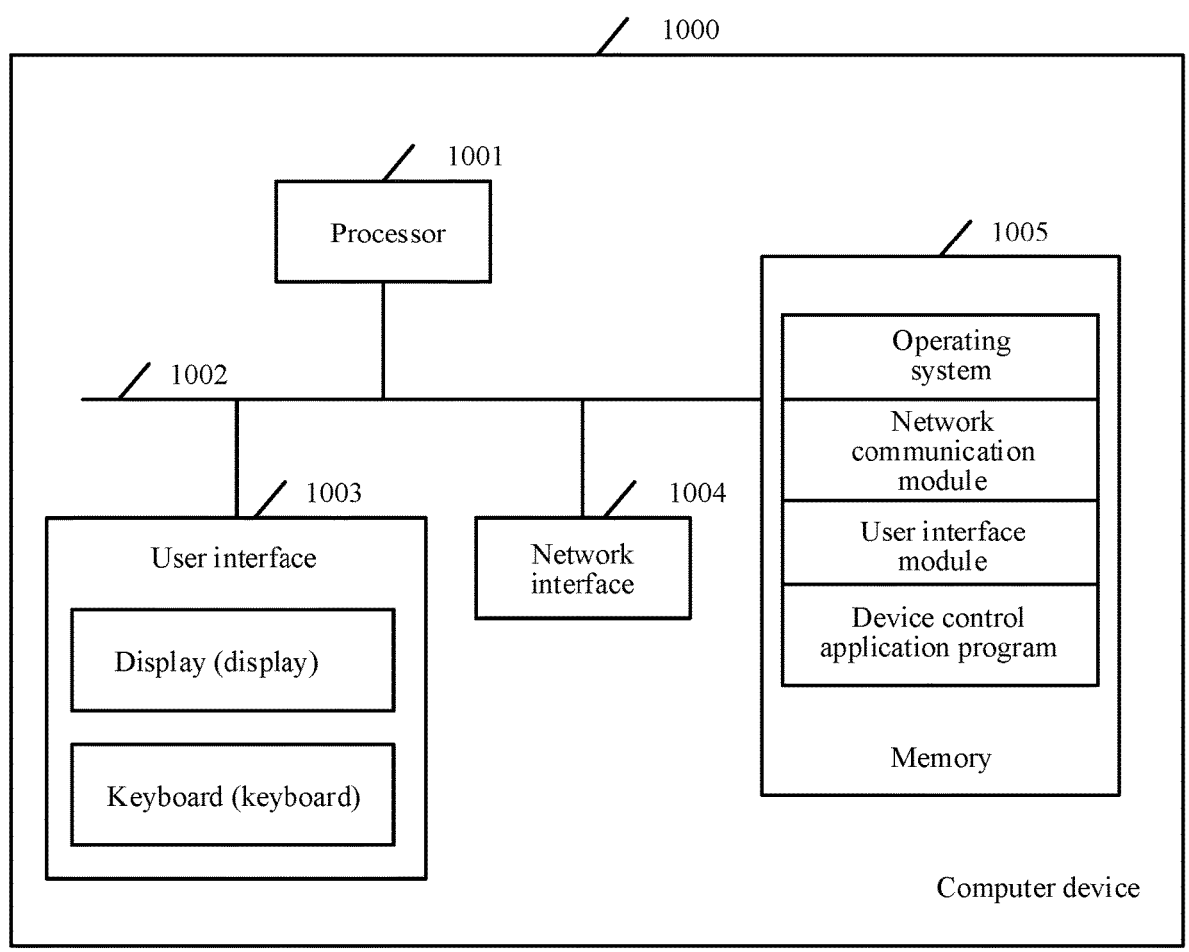
FIG. 11 is a schematic structural diagram of a computer device according to an embodiment of the present disclosure.

FIG. 11 is a schematic structural diagram of a computer device according to an embodiment of the present disclosure. As shown in FIG. 11, a computer device 1000 may include: at least one processor 1001 such as a central processing unit (CPU), at least one network interface 1004, a user interface 1003, a memory 1005, and at least one communications bus 1002. The communications bus 1002 is configured to implement communication connection between these components. The user interface 1003 may include a display and a keyboard. In some embodiments, the network interface 1004 may include a standard wired interface and wireless interface (such as a WI-FI interface). The memory 1005 may be a high-speed random access memory (RAM), or may be a non-volatile memory (non-volatile memory), such as at least one magnetic disk memory. In some embodiments, the memory 1005 may be at least one storage apparatus away from the foregoing processor 1001. As shown in FIG. 11, the memory 1005, as a computer-readable storage medium, may include an operating system, a network communications module, a user interface module, and a device control application program.

In the computer device 1000 shown in FIG. 11, the network interface 1004 may provide a network communication function. The user interface 1003 is mainly configured to provide an input interface for users. The processor 1001 may be configured to invoke the device control application program stored in the memory 1005 to implement: acquiring a data sorting request for a to-be-sorted data sequence, and invoking C data bitonic sorting components according to the data sorting request, C being a positive integer greater than 1; initiating B data bitonic sorting tasks according to the to-be-sorted data sequence and the C data bitonic sorting components, B being a positive integer greater than 1, and the B data bitonic sorting tasks being respectively associated with different to-be-sorted data subsequences, and all the B to-be-sorted data subsequences being generated based on the to-be-sorted data sequence; operating the C data bitonic sorting components in parallel according to the B data bitonic sorting tasks to obtain B data sorting subresults outputted by the C data bitonic sorting components, one data sorting subresult indicating a sorting result of the to-be-sorted data subsequence associated with one data bitonic sorting task; and combining the B data sorting subresults based on the C data bitonic sorting components to obtain a data sorting result for the to-be-sorted data sequence.

It is to understood that the computer device 1000 according to the embodiments of the present disclosure may implement the description of the data processing method in the foregoing embodiment corresponding to FIG. 2, FIG. 6 or FIG. 8, or may implement the description of the data processing apparatus 1 in the foregoing embodiment corresponding to FIG. 10, which is not described in detail here. In addition, beneficial effects of using the same method are not described in detail herein.

The embodiments of the present disclosure further provide a computer-readable storage medium, which stores a computer program. The computer program includes program instructions that, when executed by a processor, implement the data processing method provided by the steps shown in FIG. 2, FIG. 6 or FIG. 8, which may specifically refer to the implementations of the steps shown in FIG. 2, FIG. 6 or FIG. 8 and is not described in detail here. In addition, beneficial effects of using the same method are not described in detail herein.

The foregoing computer-readable storage medium may be an internal storage unit of the data processing apparatus according to any one of the foregoing embodiments or the foregoing computer device, such as a drive or an internal memory of the computer device. The computer-readable storage medium may also be an external storage device of the computer device, such as a plug-in drive, a smart media card (SMC), a secure digital (SD) card, and a flash card equipped on the computer device. Further, the computer-readable storage medium may further include both the internal storage unit and the external storage device of the computer device. The computer-readable storage medium is configured to store the computer program and other programs and data required by the computer device. The computer-readable storage medium may be further configured to temporarily store data that has been outputted or will be outputted.

The embodiments of the present disclosure provide a computer program product, which includes a computer program or a computer instruction. The computer program or the computer instruction is stored in a computer-readable storage medium. A processor of a computer device reads the computer program or the computer instruction from the computer-readable storage medium, and executes the computer program or the computer instruction to cause the computer device to implement the foregoing description of the data processing method in embodiment corresponding to FIG. 2, FIG. 6 or FIG. 8, which is not described in detail here. In addition, beneficial effects of using the same method are not described in detail herein.

The terms "first", "second", and the like in the description, the claims, and the drawings of the embodiments of the present disclosure are used to distinguish different objects rather than to describe a specific order. In addition, the terms "include" and any variant thereof are intended to cover a non-exclusive inclusion. For example, a process, method, apparatus, product or device that includes a series of steps or units is not limited to the listed steps or units, and, may further include steps or units that are not listed, or, may further include other steps or units that are intrinsic to the process, method, apparatus, product or device.

The term module (and other similar terms such as sub-module, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Those of ordinary skill in the art may understand that the exemplary units and algorithm steps described with reference to the embodiments disclosed herein can be implemented by electronic hardware, computer software, or a combination of the electronic hardware and the computer software. In order to clearly describe the interchangeability of the hardware and the software, exemplary compositions and steps have been generally described above in terms of functions. Whether these functions are performed by the hardware or the software depends on a specific application and design constraints of the technical solutions. Those skilled in the art may use different methods to implement the described functions for each specific application, but these implementations shall not be regarded as exceeding the scope of the present disclosure.

The method and related apparatus according to the embodiments of the present disclosure are described with reference to at least one of the method flowcharts and schematic structural diagrams provided in the embodiments of the present disclosure. Specifically, computer program instructions are used to implement the method flowcharts, the schematic structural diagrams, or at least one piece of the following information of the method flowcharts and the schematic structural diagrams: each process and block, and a combination of processes and blocks in the flowcharts and the block diagrams. These computer program instructions may be provided to a general-purpose computer, a dedicated computer, an embedded processor, or a processor of another programmable data processing device to generate a machine, so that the instructions executed by the computer or the processor of the another programmable data processing apparatus generate an apparatus configured to implement functions specified in one or more processes in the flowcharts and in one or more blocks in the block diagrams. These computer program instructions may also be stored in a computer-readable storage medium that can direct a computer or another programmable data processing device to work in a specific manner, so that a computer program stored in the computer-readable storage medium generates an artifact that includes an instruction apparatus. The instruction apparatus is configured to implement functions specified in one or more processes in the flowcharts and in one or more blocks in the block diagrams. These computer programs and instructions may also be loaded into a computer or another programmable data processing device, so that a series of operations and steps are performed on the computer or the another programmable device to generate computer-implemented processing. Therefore, the instructions executed by the computer or the another programmable device provide steps for implementing functions specified in one or more processes in the flowcharts and in one or more blocks in the block diagrams.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. A data processing method, performed by a computer device and comprising:
    acquiring a data sorting request for a data sequence to be sorted, and invoking C data bitonic sorting components according to the data sorting request, C being a positive integer greater than 1;
    initiating B data bitonic sorting tasks according to the data sequence and the C data bitonic sorting components, B being a positive integer greater than 1, and the B data bitonic sorting tasks being respectively associated with different data subsequences of B data subsequences, and the B data subsequences being generated based on the data sequence;
    operating the C data bitonic sorting components in parallel according to the B data bitonic sorting tasks to obtain B data sorting subresults outputted by the C data bitonic sorting components, one data sorting subresult indicating a sorting result of one of the data subsequences associated with one of the data bitonic sorting tasks; and
    combining the B data sorting subresults based on the C data bitonic sorting components to obtain a data sorting result for the data sequence.

2. The method according to claim 1, further comprising:
    transmitting the data sorting request to a task control component, the data sorting request carrying a first total quantity of data in the data sequence; and
    the initiating B data bitonic sorting tasks according to the data sequence and the C data bitonic sorting components comprising:
    determining, in the task control component, a quantity to be sorted associated with the first total quantity, the quantity being equal to or greater than the first total quantity;
    acquiring a total data storage capacity corresponding to the C data bitonic sorting components, and comparing the quantity to be sorted with the total data storage capacity to obtain a first comparison result; and
    initiating the B data bitonic sorting tasks according to the first comparison result.

3. The method according to claim 2, wherein the initiating the B data bitonic sorting tasks according to the first comparison result comprises:
    in response to that the quantity is greater than the total data storage capacity, acquiring a first quantity ratio of the quantity to the total data storage capacity, and initiating the B data bitonic sorting tasks according to the first quantity ratio, a product of C and the first quantity ratio being equal to B, a second total quantity carried in one data bitonic sorting task being equal to a total quantity of data in the data subsequence associated with one data bitonic sorting task; and
    in response to that the quantity is less than or equal to the total data storage capacity, initiating the B data bitonic sorting tasks according to the C data bitonic sorting components, B being equal to C.

4. The method according to claim 1, wherein the operating the C data bitonic sorting components in parallel according to the B data bitonic sorting tasks to obtain B data sorting subresults outputted by the C data bitonic sorting components comprises:

distributing the B data bitonic sorting tasks to the C data bitonic sorting components in response to that B is equal to C, one data bitonic sorting task being distributed to one data bitonic sorting component; and operating the B data bitonic sorting tasks in parallel through the C data bitonic sorting components to obtain data sorting subresults respectively outputted by the C data bitonic sorting components.

5. The method according to claim 4, wherein the B data bitonic sorting tasks comprise a data bitonic sorting task $D_e$, and e is a positive integer less than or equal to B; the B data subsequences comprise a data subsequence $A_e$ corresponding to the data bitonic sorting task $D_e$; the C data bitonic sorting components comprise a data bitonic sorting component $F_e$ configured to execute the data bitonic sorting task $D_e$; and the operating the B data bitonic sorting tasks in parallel through the C data bitonic sorting components to obtain data sorting subresults respectively outputted by the C data bitonic sorting components comprises:

acquiring, by the data bitonic sorting component $F_e$, the data subsequence $A_e$ corresponding to the data bitonic sorting task $D_e$, and performing bitonic sorting on the data subsequence $A_e$ to obtain a data sorting subresult corresponding to the data subsequence $A_e$; and when operating the data bitonic sorting component $F_e$, operating B-1 data bitonic sorting tasks in parallel through C-1 data bitonic sorting components, to obtain data sorting subresults respectively outputted by the C-1 data bitonic sorting components, the C-1 data bitonic sorting components referring to data bitonic sorting components in the C data bitonic sorting components except the data bitonic sorting component $F_e$, and the B-1 data bitonic sorting tasks referring to data bitonic sorting tasks in the B data bitonic sorting tasks except the data bitonic sorting tasks $D_e$.

6. The method according to claim 5, wherein the data sorting request carries read addresses respectively corresponding to the data in the data sequence, and a sort order for the data sequence; and the acquiring, in the data bitonic sorting component $F_e$, the data subsequence $A_e$ corresponding to the data bitonic sorting task $D_e$ comprises:

acquiring, by the data bitonic sorting component $F_e$, a target read address and a second total quantity that are carried in the data bitonic sorting task $D_e$, the read addresses respectively corresponding to the data in the data sequence comprising the target read address, and the second total quantity indicating a total quantity of data in the data subsequence $A_e$;

transmitting a data acquisition request carrying the target read address to a data read/write component, and acquiring an initial data subsequence from the target read address through the data read/write component, the initial subsequence belonging to the data sequence;

determining a quantity difference between the second total quantity and a third total quantity, the third total quantity indicating a total quantity of data in the initial data subsequence;

acquiring supplementary data according to the quantity difference and the sort order, and adding the supplementary data to the initial data subsequence to obtain the data subsequence $A_e$; and loading the data subsequence $A_e$ into a storage component corresponding to the data bitonic sorting component $F_e$.

7. The method according to claim 5, wherein the data bitonic sorting component $F_e$ comprises a sort control subcomponent, a round control subcomponent, a data acquisition subcomponent, and a bitonic sorting subcomponent; and the performing bitonic sorting on the data subsequence $A_e$ to obtain a data sorting subresult corresponding to the data subsequence $A_e$ comprises:

initiating the round control subcomponent in response to that the sort control subcomponent acquires a data loading completion notification, the data loading completion notification indicating that the storage component corresponding to the data bitonic sorting component $F_e$ has loaded the data subsequence $A_e$;

determining, by the round control subcomponent, a bitonic sorting phase corresponding to the data subsequence $A_e$ and bitonic sorting logical parameters corresponding to the bitonic sorting phase according to the second total quantity; transmitting the bitonic sorting phase and the bitonic sorting logical parameters corresponding to the bitonic sorting phase to the data acquisition subcomponent, the second total quantity indicating a total quantity of data in the data subsequence $A_e$;

acquiring, by the data acquisition subcomponent, intermediate data according to the bitonic sorting phase and the bitonic sorting logical parameters corresponding to the bitonic sorting phase; transmitting the intermediate data to the bitonic sorting subcomponent, and sorting the intermediate data by the bitonic sorting subcomponent to obtain an intermediate sorting subresult; and determining the data sorting subresult corresponding to the data subsequence $A_e$ according to the intermediate sorting subresult, the data subsequence $A_e$ comprising the intermediate data.

8. The method according to claim 7, wherein there are at least two bitonic sorting phases; and the acquiring, by the data acquisition subcomponent, intermediate data according to the bitonic sorting phase and the bitonic sorting logical parameters corresponding to the bitonic sorting phase; transmitting the intermediate data to the bitonic sorting subcomponent, and sorting the intermediate data by the bitonic sorting subcomponent to obtain an intermediate sorting subresult; and determining the data sorting subresult corresponding to the data subsequence $A_e$ according to the intermediate sorting subresult comprises:

reading, by the data acquisition subcomponent, a first data sorting transition subresult from the storage component according to an $i^{th}$ bitonic sorting phase in the at least two bitonic sorting phases, i being a positive integer greater than 1, and the first data sorting transition subresult being an output result of a $(i-1)^{th}$ bitonic sorting phase, bitonic sorting logical parameters corresponding to the $i^{th}$ bitonic sorting phase comprising logical parameters of n rounds of sorting, and n being determined based on i and being a positive integer greater than 1;

acquiring the intermediate data from an intermediate data sorting transition subresult according to logical parameters of a $i^{th}$ round of sorting, j being a positive integer less than or equal to n, the intermediate data sorting transition subresult being the first data sorting transition subresult in response to that j is 1, and the intermediate data sorting transition subresult being a second data sorting transition subresult cached in the data acquisition subcomponent in response to that j is not 1, and the second data sorting transition subresult being determined based on logical parameters of a $(j-1)^{th}$ round of sorting;

transmitting the intermediate data to the bitonic sorting subcomponent, sorting the intermediate data by the bitonic sorting subcomponent to obtain the intermediate sorting subresult of the intermediate data, and determining a third data sorting transition subresult corresponding to the data subsequence $A_e$ according to the intermediate sorting subresult;

caching the third data sorting transition subresult into the data acquisition subcomponent in response to that j is less than n; and storing the third data sorting transition subresult into the storage component in response to that j=n, and the $i^{th}$ bitonic sorting phase is the last bitonic sorting phase in the at least two bitonic sorting phases, and determining the third data sorting transition subresult as the data sorting subresult corresponding to the data subsequence $A_e$.

9. The method according to claim 1, wherein the operating the C data bitonic sorting components in parallel according to the B data bitonic sorting tasks to obtain B data sorting subresults outputted by the C data bitonic sorting components comprises:

dividing the B data bitonic sorting tasks into K*C data bitonic sorting tasks in response to that B is greater than C, K being maximum rounds of operation respectively corresponding to the C data bitonic sorting components;

distributing C data bitonic sorting tasks in an $i^{th}$ round of operation to the C data bitonic sorting components, one data bitonic sorting task being distributed to one data bitonic sorting component, and i being a positive integer less than or equal to K; and operating the C data bitonic sorting tasks in the $i^{th}$ round of operation in parallel through the C data bitonic sorting components to obtain data sorting subresults respectively outputted by the C data bitonic sorting components, and obtaining data sorting subresults respectively corresponding to the B data bitonic sorting tasks in response to that i is equal to K.

10. The method according to claim 1, wherein the combining the B data sorting subresults based on the C data bitonic sorting components to obtain a data sorting result for the data sequence comprises:

acquiring U data sorting subresult pairs during an $L^{th}$ combination, U being a positive integer, L being a positive integer, the U data sorting subresult pairs being generated based on the B data sorting subresults in response to that L is 1, and the U data sorting subresult pairs being generated based on a historical combined data sorting subresult in response to that L is not 1, and the historical combined data sorting subresult being a subresult obtained during a (L−1) combination;

combining the U data sorting subresult pairs based on the C data bitonic sorting components to obtain U target combined data sorting subresults;

determining the U target combined data sorting subresults as the data sorting result corresponding to the data sequence in response to that U is equal to 1; and combining the U target combined data sorting subresults based on the C data bitonic sorting components during a $(L+1)^{th}$ combination to obtain the data sorting result for the data sequence in response to that U is greater than 1.

11. The method according to claim 10, wherein the U data sorting subresult pairs comprise a data sorting subresult pair $M_p$, and p is a positive integer less than or equal to U; and the combining the U data sorting subresult pairs based on the C data bitonic sorting components to obtain U target combined data sorting subresults comprises:

determining a fourth total quantity of data associated with the data sorting subresult pair $M_p$, and a data storage capacity corresponding to a data bitonic sorting component that is associated with the data sorting subresult pair $M_p$, the C data bitonic sorting components comprising the data bitonic sorting component associated with the data sorting subresult pair $M_p$;

comparing the fourth total quantity with the data storage capacity to obtain a second comparison result;

performing bitonic sorting on the data sorting subresult pair $M_p$ according to the second comparison result and the data bitonic sorting component associated with the data sorting subresult pair $M_p$ to obtain a target combined data sorting subresult corresponding to the data sorting subresult pair $M_p$; and determining target combined data sorting subresults corresponding to the U data sorting subresult pairs as the U target combined data sorting subresults.

12. The method according to claim 11, wherein the data sorting subresult pair $M_p$ comprises a first data sorting subresult and a second data sorting subresult; and the performing bitonic sorting on the data sorting subresult pair $M_p$ according to the second comparison result and the data bitonic sorting component associated with the data sorting subresult pair $M_p$ to obtain a target combined data sorting subresult corresponding to the data sorting subresult pair $M_p$ comprises:

equally dividing the first data sorting subresult into a first ordered data segment and a second ordered data segment, and equally dividing the second data sorting subresult into a third ordered data segment and a fourth ordered data segment in response to that the fourth total quantity is greater than the data storage capacity;

performing bitonic sorting on the first ordered data segment and the third ordered data segment based on a first data bitonic sorting component to obtain a third data sorting subresult in response to that data in the first ordered data segment is less than or equal to data in the second ordered data segment, and data in the third ordered data segment is less than or equal to data in the fourth ordered data segment, the data bitonic sorting component associated with the data sorting subresult pair $M_p$ comprising the first data bitonic sorting component;

performing bitonic sorting on the second ordered data segment and the fourth ordered data segment based on a second data bitonic sorting component to obtain a fourth data sorting subresult, the data bitonic sorting component associated with the data sorting subresult pair $M_p$ comprising the second data bitonic sorting component;

equally dividing the third data sorting subresult into a fifth ordered data segment and a sixth ordered data segment, and equally dividing the fourth data sorting subresult into a seventh ordered data segment and an eighth ordered data segment;

performing bitonic sorting on the sixth ordered data segment and the seventh ordered data segment based on a target data bitonic sorting component to obtain a fifth data sorting subresult in response to that data in the fifth ordered data segment is less than or equal to data in the sixth ordered data segment, and data in the seventh ordered data segment is less than or equal to data in the eighth ordered data segment, the target data bitonic sorting component being the first data bitonic sorting component or the second data bitonic sorting component; and determining the target combined data sorting subresult corresponding to the data sorting subresult pair $M_p$ based on the fifth ordered data segment, the fifth data sorting subresult, and the eighth ordered data segment.

13. The method according to claim 1, wherein each of the C data bitonic sorting components comprises an index generation subcomponent configured to assign an index value to each piece of data in the data sequence; the data sorting request carries a write address; and the method further comprises:

acquiring the index value corresponding to each piece of data in the data sorting result in sequence, and generating an index value sequence with a sequence length the same as that of the data sequence according to acquired index values; and transmitting a data write request for the index value sequence to the data read/write component, and storing the index value sequence into the write address through the data read/write component.

14. A data processing apparatus, comprising:

at least one processor, and at least one memory, the at least one memory being configured to store a computer program, and the at least one processor being configured to invoke the computer program and perform:

acquiring a data sorting request for a data sequence to be sorted, and invoking C data bitonic sorting components according to the data sorting request, C being a positive integer greater than 1;

initiating B data bitonic sorting tasks according to the data sequence and the C data bitonic sorting components, B being a positive integer greater than 1, and the B data bitonic sorting tasks being respectively associated with different data subsequences of B data subsequences, and the B data subsequences being generated based on the data sequence;

operating the C data bitonic sorting components in parallel according to the B data bitonic sorting tasks to obtain B data sorting subresults outputted by the C data bitonic sorting components, one data sorting subresult indicating a sorting result of one of the data subsequences associated with one of the data bitonic sorting tasks; and combining the B data sorting subresults based on the C data bitonic sorting components to obtain a data sorting result for the data sequence.

15. The apparatus according to claim 14, wherein:

the at least one processor is further configured to perform:

transmitting the data sorting request to a task control component, the data sorting request carrying a first total quantity of data in the data sequence; and the initiating B data bitonic sorting tasks according to the data sequence and the C data bitonic sorting components comprises:

determining, in the task control component, a quantity to be sorted associated with the first total quantity, the quantity being equal to or greater than the first total quantity;

acquiring a total data storage capacity corresponding to the C data bitonic sorting components, and comparing the quantity to be sorted with the total data storage capacity to obtain a first comparison result; and initiating the B data bitonic sorting tasks according to the first comparison result.

16. The apparatus according to claim 15, wherein the initiating the B data bitonic sorting tasks according to the first comparison result comprises:

in response to that the quantity is greater than the total data storage capacity, acquiring a first quantity ratio of the quantity to the total data storage capacity, and initiating the B data bitonic sorting tasks according to the first quantity ratio, a product of C and the first quantity ratio being equal to B, a second total quantity carried in one data bitonic sorting task being equal to a total quantity of data in the data subsequence associated with one data bitonic sorting task; and initiating the B data bitonic sorting tasks according to the C data bitonic sorting components in response to that the quantity is less than or equal to the total data storage capacity, B being equal to C.

17. The apparatus according to claim 14, wherein the operating the C data bitonic sorting components in parallel according to the B data bitonic sorting tasks to obtain B data sorting subresults outputted by the C data bitonic sorting components comprises:

distributing the B data bitonic sorting tasks to the C data bitonic sorting components in response to that B is equal to C, one data bitonic sorting task being distributed to one data bitonic sorting component; and operating the B data bitonic sorting tasks in parallel through the C data bitonic sorting components to obtain data sorting subresults respectively outputted by the C data bitonic sorting components.

18. The apparatus according to claim 17, wherein the B data bitonic sorting tasks comprise a data bitonic sorting task $D_e$, and e is a positive integer less than or equal to B; the B data subsequences comprise a data subsequence $A_e$ corresponding to the data bitonic sorting task $D_e$; the C data bitonic sorting components comprise a data bitonic sorting component $F_e$ configured to execute the data bitonic sorting task $D_e$; and the operating the B data bitonic sorting tasks in parallel through the C data bitonic sorting components to obtain data sorting subresults respectively outputted by the C data bitonic sorting components comprises:

acquiring, by the data bitonic sorting component $F_e$, the data subsequence $A_e$ corresponding to the data bitonic sorting task $D_e$, and performing bitonic sorting on the data subsequence $A_e$ to obtain a data sorting subresult corresponding to the data subsequence $A_e$; and when operating the data bitonic sorting component $F_e$, operating B-1 data bitonic sorting tasks in parallel through C-1 data bitonic sorting components, to obtain data sorting subresults respectively outputted by the C-1 data bitonic sorting components, the C-1 data bitonic sorting components referring to data bitonic sorting components in the C data bitonic sorting components except the data bitonic sorting component $F_e$, and the B-1 data bitonic sorting tasks referring to data bitonic sorting tasks in the B data bitonic sorting tasks except the data bitonic sorting tasks $D_e$.

19. The apparatus according to claim 18, wherein the data sorting request carries read addresses respectively corresponding to the data in the data sequence, and a sort order for the data sequence; and the acquiring, in the data bitonic sorting component $F_e$, the data subsequence $A_e$ corresponding to the data bitonic sorting task $D_e$ comprises:

acquiring, by the data bitonic sorting component $F_e$, a target read address and a second total quantity that are carried in the data bitonic sorting task $D_e$, the read addresses respectively corresponding to the data in the data sequence comprising the target read address, and the second total quantity indicating a total quantity of data in the data subsequence $A_e$;

transmitting a data acquisition request carrying the target read address to a data read/write component, and acquiring an initial data subsequence from the target read address through the data read/write component, the initial subsequence belonging to the data sequence;

determining a quantity difference between the second total quantity and a third total quantity, the third total quantity indicating a total quantity of data in the initial data subsequence;

acquiring supplementary data according to the quantity difference and the sort order, and adding the supplementary data to the initial data subsequence to obtain the data subsequence $A_e$; and loading the data subsequence $A_e$ into a storage component corresponding to the data bitonic sorting component $F_e$.

20. A non-transitory computer-readable storage medium, storing a computer program, the computer program being adapted to be loaded and executed by at least one processor of a computer to cause the computer device to perform:

acquiring a data sorting request for a data sequence to be sorted, and invoking C data bitonic sorting components according to the data sorting request, C being a positive integer greater than 1;

initiating B data bitonic sorting tasks according to the data sequence and the C data bitonic sorting components, B being a positive integer greater than 1, and the B data bitonic sorting tasks being respectively associated with different data subsequences of B data subsequences, and the B data subsequences being generated based on the data sequence;

operating the C data bitonic sorting components in parallel according to the B data bitonic sorting tasks to obtain B data sorting subresults outputted by the C data bitonic sorting components, one data sorting subresult indicating a sorting result of one of the data subsequences associated with one of the data bitonic sorting tasks; and combining the B data sorting subresults based on the C data bitonic sorting components to obtain a data sorting result for the data sequence.

* * * * *